(12) United States Patent
Stewart et al.

(10) Patent No.: US 7,646,300 B2
(45) Date of Patent: Jan. 12, 2010

(54) MASTER TAGS

(75) Inventors: Roger Green Stewart, Morgan Hill, CA (US); Daniel Noah Paley, Redwood City, CA (US)

(73) Assignee: Intelleflex Corporation, San Jose, CA (US)

( * ) Notice: Subject to any disclaimer, the term of this patent is extended or adjusted under 35 U.S.C. 154(b) by 873 days.

(21) Appl. No.: 10/975,226

(22) Filed: Oct. 27, 2004

(65) Prior Publication Data

US 2006/0087407 A1    Apr. 27, 2006

(51) Int. Cl.
*H04Q 5/22* (2006.01)
(52) U.S. Cl. .................................... 340/572.1; 340/5.6
(58) Field of Classification Search .................. 340/5.6, 340/572.1, 10.1, 10.2, 10.4, 825.54, 539.2
See application file for complete search history.

(56) References Cited

U.S. PATENT DOCUMENTS

| | | | | |
|---|---|---|---|---|
| 4,525,713 | A | 6/1985 | Barletta et al. | 340/825.54 |
| 5,565,858 | A | 10/1996 | Guthrie | 340/10.33 |
| 5,952,922 | A | 9/1999 | Shober | 340/572.4 |
| 6,172,596 | B1 | 1/2001 | Cesar et al. | 340/10.41 |
| 6,456,191 | B1 | 9/2002 | Federman | 340/10.2 |
| 6,677,852 | B1 | 1/2004 | Landt | 340/10.1 |
| 6,970,070 | B2 * | 11/2005 | Juels et al. | 340/10.1 |
| 7,212,121 | B2 * | 5/2007 | Hashimoto et al. | 340/572.1 |
| 7,286,043 | B2 | 10/2007 | Carrender et al. | 340/10.42 |
| 2002/0075151 | A1 | 6/2002 | Lancos et al. | 340/572.1 |
| 2002/0180588 | A1 | 12/2002 | Erickson et al. | 340/10.2 |
| 2002/0196126 | A1 | 12/2002 | Eisenberg et al. | 340/10.2 |
| 2003/0007473 | A1 | 1/2003 | Strong et al. | 370/338 |
| 2004/0024570 | A1 | 2/2004 | Muehl et al. | 702/184 |
| 2004/0082296 | A1 | 4/2004 | Twitchell | 455/41.2 |
| 2004/0246103 | A1 * | 12/2004 | Zukowski | 340/10.41 |
| 2005/0024200 | A1 * | 2/2005 | Lambright et al. | 340/539.1 |
| 2005/0275531 | A1 * | 12/2005 | Johnson | 340/539.22 |
| 2006/0047961 | A1 * | 3/2006 | Hashimoto et al. | 713/173 |

OTHER PUBLICATIONS

International Search Report and Written Opinion from PCT Application No. PCT/US2005/02381 mailed on Aug. 9, 2007.
Molnar et al., "Privacy and Security in Library RFID Issues, Practices, and Architectures" CCS '04, Oct. 25-29, 2004; Copyright 2004 ACM, pp. 210-219.

* cited by examiner

*Primary Examiner*—Brian A Zimmerman
*Assistant Examiner*—Nabil H Syed
(74) *Attorney, Agent, or Firm*—Zilka-Kotab, PC

(57) ABSTRACT

A method for creating a hierarchy of radio frequency identification (RFID) tags and the resultant system include associating each of a plurality of first RFID tags with an individual object of a plurality of objects, each first RFID tag storing identification information about the object with which it is associated. Identification information about each of the first RFID tags is stored in a second RFID tag that can physically accompany the first RFID tags during transportation.

73 Claims, 12 Drawing Sheets

MASTER TAGS

FIELD OF THE INVENTION

The present invention relates to data storage on data tags, and more particularly, this invention relates to master tags containing information about other data tags.

BACKGROUND OF THE INVENTION

Automatic identification ("Auto-ID") technology is used to help machines identify objects and capture data automatically. One of the earliest Auto-ID technologies was the bar code, which uses an alternating series of thin and wide bands that can be digitally interpreted by an optical scanner. This technology gained widespread adoption and near-universal acceptance with the designation of the universal product code ("UPC")—a standard governed by an industry-wide consortium called the Uniform Code Council. Formally adopted in 1973, the UPC is one of the most ubiquitous symbols present on virtually all manufactured goods today and has allowed for enormous efficiency in the tracking of goods through the manufacturing, supply, and distribution of various goods.

However, the bar code still requires manual interrogation by a human operator to scan each tagged object individually with a scanner. This is a line-of-sight process that has inherent limitations in speed and reliability. In addition, the UPC bar codes only allow for manufacturer and product type information to be encoded into the barcode, not the unique item's serial number. The bar code on one milk carton is the same as every other, making it impossible to count objects or individually check expiration dates.

Currently cartons are marked with barcode labels. These printed labels have over 40 "standard" layouts, can be misprinted, smeared, mis-positioned and mis-labeled. In transit, these outer labels are often damaged or lost. Upon receipt, the pallets typically have to be broken-down and each case scanned into an enterprise system. Error rates at each point in the supply chain have been 4-18% thus creating a billion dollar inventory visibility problem. Only with radio frequency identification ("RFID") does the physical layer of actual goods automatically tie into software applications, to provide accurate tracking.

The emerging RFID technology employs a radio frequency ("RF") wireless link and ultra-small embedded computer chips, to overcome these barcode limitations. RFID technology allows physical objects to be identified and tracked via these wireless "tags". It functions like a bar code that communicates to the reader automatically without needing manual line-of-sight scanning or singulation of the objects. RFID promises to radically transform the retail, pharmaceutical, military, and transportation industries.

The advantages of RFIDs over bar code are summarized in Table 1:

TABLE 1

| Barcode | RFID |
| --- | --- |
| Need line-of-sight to read | Identification without visual contact |
| Read only | Able to read/write |
| Only a barcode number | Able to store information in tag |
| Barcode number is fixed | Information can be renewed anytime |
| Category level tagging only-no unique item identifier | Unique item identification |
| Unable to read if barcode is damaged | Can withstand harsh environment |

TABLE 1-continued

| Barcode | RFID |
| --- | --- |
| damaged | |
| Use once | Reusable |
| Low cost | Higher cost |
| Less Flexibility | Higher Flexibility/Value |

As shown in FIG. 1, an RFID system 100 includes a tag 102, a reader 104, and an optional server 106. The tag 102 includes an IC chip and an antenna. The IC chip includes a digital decoder needed to execute the computer commands the tag 102 receives from the tag reader 104. The IC chip also includes a power supply circuit to extract and regulate power from the RF reader; a detector to decode signals from the reader; a transmitter to send data back to the reader; anti-collision protocol circuits; and at least enough EEPROM memory to store its EPC code.

Communication begins with a reader 104 sending out signals to find the tag 102. When the radio wave hits the tag 102 and the tag 102 recognizes the reader's signal, the reader 104 decodes the data programmed into the tag 102. The information is then passed to a server 106 for processing. By tagging a variety of items, information about the nature and location of goods can be known instantly and automatically.

The system uses reflected or "backscattered" radio frequency (RF) waves to transmit information from the tag 102 to the reader 104. Since passive (Class-1 and Class-2) tags get all of their power from the reader signal, the tags are only powered when in the beam of the reader 104.

The Auto ID Center EPC-Compliant tag classes are set forth below:

Class-1
Identity tags (RF user programmable, maximum range 3 m)
Lowest cost (AIDC Targets: 5¢ moving down to 2¢ in trillion-unit/yr volumes)
Class-2
Memory tags (8 bits to 128 Mbits programmable at maximum 3 m range)
Security & privacy protection
Low cost (AIDC Targets: typically 10¢ at billion-unit volumes)
Class-3
Battery tags (256 bits to 64 Kb)
Self-Powered Backscatter (internal clock, sensor interface support)
100 meter range
Moderate cost (Targets: $50 currently, $5 in 2 years, 20¢ at billion-unit volumes)
Class-4
Active tags
Active transmission (permits tag-speaks-first operating modes)
Up to 30,000 meter range
Higher cost (Targets: $10 in 2 years, 30¢ in billion-unit volumes)

Semi-passive and active tags have a battery to provide power to the chip. This greatly increases read range, and the reliability of tag reads, because the tag doesn't need power from the reader. Class-3 tags only need a 10 mV signal from the reader in comparison to the 500 mV that a Class-1 tag needs to operate. This 2,500:1 reduction in power requirement permits Class-3 tags to operate out to a distance of 100 meters or more compared with a Class-1 range of only about 3 meters.

In a retail environment, RFID tags can be affixed to goods, each tag having a unique identifier (ID) that identifies the tag, a password that ensures that only the retailer system can communicate with the tag, and a kill password that disables the tag. Then, instead of requiring a cashier to scan the UPC bar code for each item, an RFID reader can simply scan the tags attached to all of the items in the customer's cart almost instantaneously. The kill passwords can then be used to disable the tags. Particularly, because each item has a tag that uniquely identifies that individual item, the retailer computer system can quickly determine the price of the item, remove that item from present inventory, disable the tag to protect the privacy of the consumer, etc. The benefits of such an RFID system are evident.

Current distribution systems require the distributor to parallel the physical delivery of goods with electronic delivery of the passwords for tags affixed to the goods. A problem arises, however, due to the fact that the tags and passwords are not delivered together. The physical goods pass through a whole series of warehouses and trucks prior to reaching their final destination. Goods from varying sources are often consolidated in trucks and reach the store together. However, the passwords go to servers all throughout the Internet, with no relationship to the physical transfer of the goods whatsoever.

The passwords from the many different manufacturers must ultimately be aggregated locally in order to be able to sell the items. However, the huge number of tags present at any one establishment coupled with the inherent difficulties in keeping track of every single tag received at the store and its corresponding, electronically-delivered passwords creates an almost insurmountable barrier to efficient operations. The task is compounded even further by the inevitable misdelivery or rerouting of goods.

A further problem is that electronic delivery of tag passwords is not 100% secure, as the passwords must be downloaded via the Internet, received in an email, etc. A hacker or eavesdropper could potentially intercept the transmission and obtain the passwords. With the passwords, a hacker could potentially disable tags and steal items, and even mischievously disable entire sets of tags in the store, opening the door to theft.

Another problem with electronic delivery of passwords is the time required. When the goods arrive at the store, their tags need to be accessed. However, if the tags are cloaked, their passwords must be sent to them before they will disclose their data. If the passwords are not readily available, the RFID system must retrieve them from a remote network site before they can be moved onto shelves.

Further, some systems attempt to download the passwords on an as-needed basis. However, this causes delays, as the RFID system may need to search up through several layers of software to find the correct password list, find the correct password, verify that the RFID system is authorized to download the password, download the password, and then only perform the read. Thus, several seconds can elapse for each item, meaning that the pallet will have to remain in the scan area until each item therein is identified.

Another issue is personal privacy. Assuming a retailer cannot retrieve the passwords and uses UPC codes instead, the tags remain active. If the retailer does not have kill passwords, it cannot disable the tags at checkout. If the tags remain live, a rogue reader can query the tags to determine what a customer has purchased. This raises privacy concerns, particularly where sensitive items such as prescriptions are being purchased.

What is needed is a way to store passwords and other information for a first device in a second device that is secure and readily available to the system which will ultimately require the information.

What is also needed is a way to take advantage of the physical transfer of goods throughout a supply chain to also deliver electronic data about those goods and tags coupled thereto.

SUMMARY OF THE INVENTION

To solve the aforementioned problems, RFID tags can be structured in a hierarchy, where higher level "master" tags contain information about tags in a lower level. In this way, the master tags can physically follow the lower level tags from one geographic location to another. Being delivered together, the aforementioned logistics problems are avoided.

A method for creating a hierarchy of radio frequency identification (RFID) tags and the resultant system include associating each of a plurality of first RFID tags with an individual object of a plurality of objects, each first RFID tag storing identification information about the object with which it is associated. Identification information about each of the first RFID tags is stored in a second RFID tag.

The second RFID tag may have security features, such as requiring a password for accessing the identification information stored on the second RFID tag. The second RFID tag can also store access passwords for each of the first RFID tags, the access passwords being required for accessing information stored on the first RFID tags. Accordingly the access passwords of the first and second RFID tags can be changed and stored in the second RFID tag at any stage along the transportation route of the tags. The second RFID tag can also store kill passwords for disabling access to information stored on the first RFID tags.

The hierarchy can be expanded. For instance, a third RFID tag stores identification information or a portion thereof about several fourth RFID tags, each of the fourth RFID tags being associated with additional objects, the fourth RFID tags identifying the objects with which associated. A fifth RFID tag can then store information about the second and third RFID tags such as passwords for accessing the second and third RFID tags.

The tags in higher levels can be in a higher class, the same class, or even in a lower class than tags at the lower levels of the hierarchy.

To enhance security, the second RFID tag can be stored in a secure environment during transportation. For example, the secure environment can be a container capable of shielding radio frequency transmissions. The secure environment could also be a container having a physical locking mechanism.

In one embodiment, one of the first RFID tags becomes locked if it removed from physical proximity of the second RFID tag beyond a predetermined distance. In another embodiment, one of the first RFID tags damages the object with which associated if that particular first RFID tag is removed from physical proximity of the second RFID tag beyond a predetermined distance.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

Figure 1:
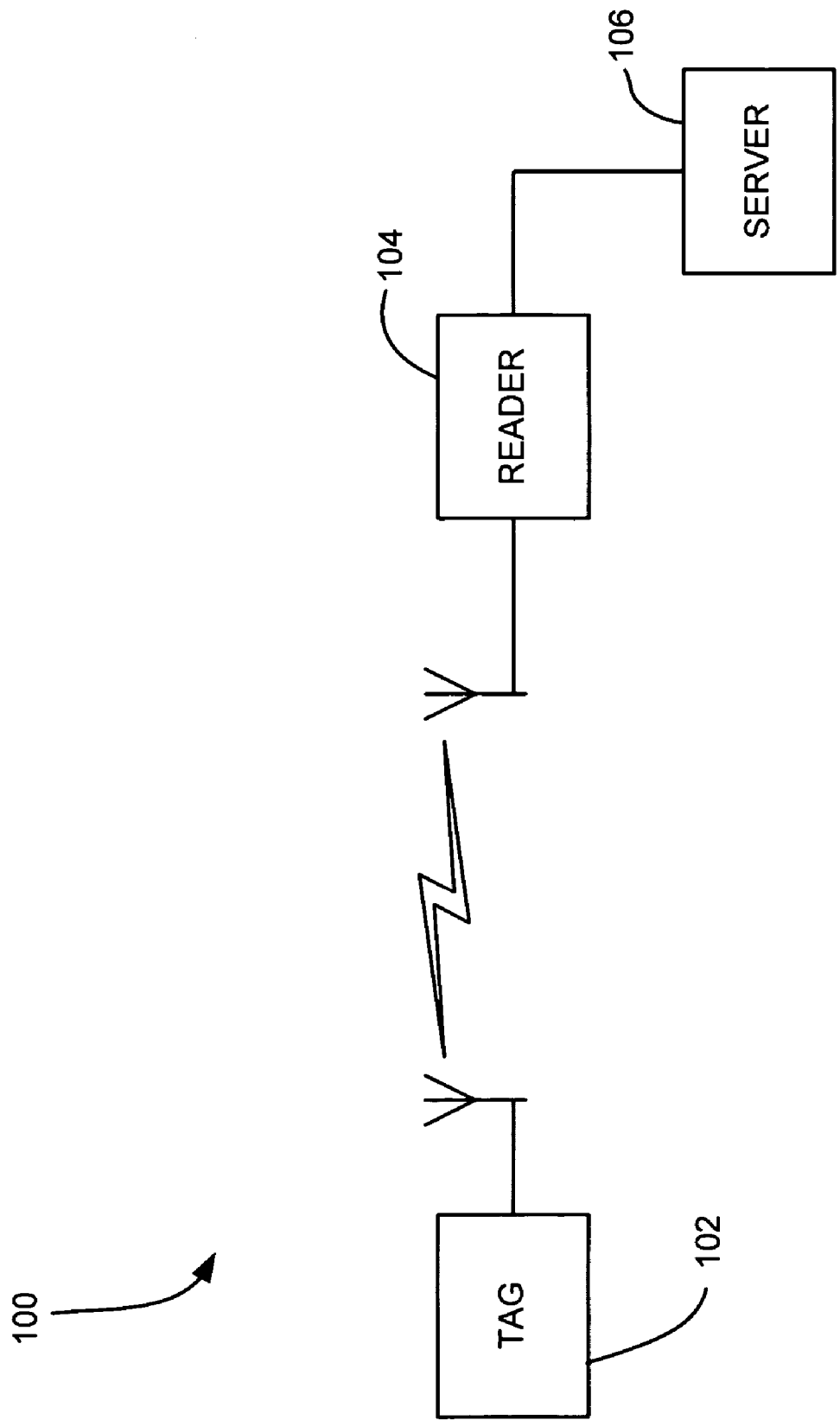
FIG. 1 is a system diagram of an RFID system.

The following description is the best embodiment presently contemplated for carrying out the present invention. This description is made for the purpose of illustrating the general principles of the present invention and is not meant to limit the inventive concepts claimed herein.

One embodiment of the present invention disclosed herein is best described as a secret key, exchanged random key encryption system. In describing the method and device for its implementation, examples will be provided. These examples are not intended to be an exhaustive description of each potential configuration, but to show how one potential circuit may be configured. Variables may have initial conditions, which when chosen, have better results than other initial values. These variables and configurations are for illustration purpose only, and do not suggest the only values which may be utilized.

The present invention allows a plain message, in a known and unencrypted form to be modified in a known way such that a cipher message is generated. This cipher message is intended to allow a secure method for transmission through open channels. A potential use would be to allow private conversations (device to device) over a public medium (such as radio frequency RF) of, but not limited to, commands, data streams, and text messages. It is described as a serial to serial transmission medium. It may also be used for other types of transmission mediums (such as parallel transmission). Additionally, the principles and circuitry set forth herein are applicable to any type of system where a first device communicates with a second device. For example, the devices can include computers, telephones, personal digital assistants ("PDAs") and other handheld devices, digital cameras, combinations thereof, etc. However, for simplicity, much of the description shall refer to an RFID system in which a reader communicates with one or more RFID tags.

Used in this document are terms which need defining. These definitions are used as an example and to aid in discussion. There are in no way exhaustive in their description and should be understood as such.

Plain text or Plain message: is a body of information, in a known format, which is understood by both the transmitting party and the receiving party. It may also be understood by any unknown third party who is able to observe the information.

Encrypted text or encrypted message: is a body of information, in a scrambled format, which is only understood by the transmitting and receiving parties. Any third party who may view the information should not be able to understand the content, thus, keeping the information secret.

Shared Password (Secret Code): Selected blocks of information of known length and content which have been passed from the transmitter to the receiver in a previously secure manner and is not open to scrutiny of third parties. This information forms the basis of codes to secure future communications.

Random number: One of a sequence of numbers considered appropriate for satisfying certain statistical tests or believed to be free from conditions that might bias the result of a calculation.

Simple Secure Exchange of Random Numbers

Figure 2:
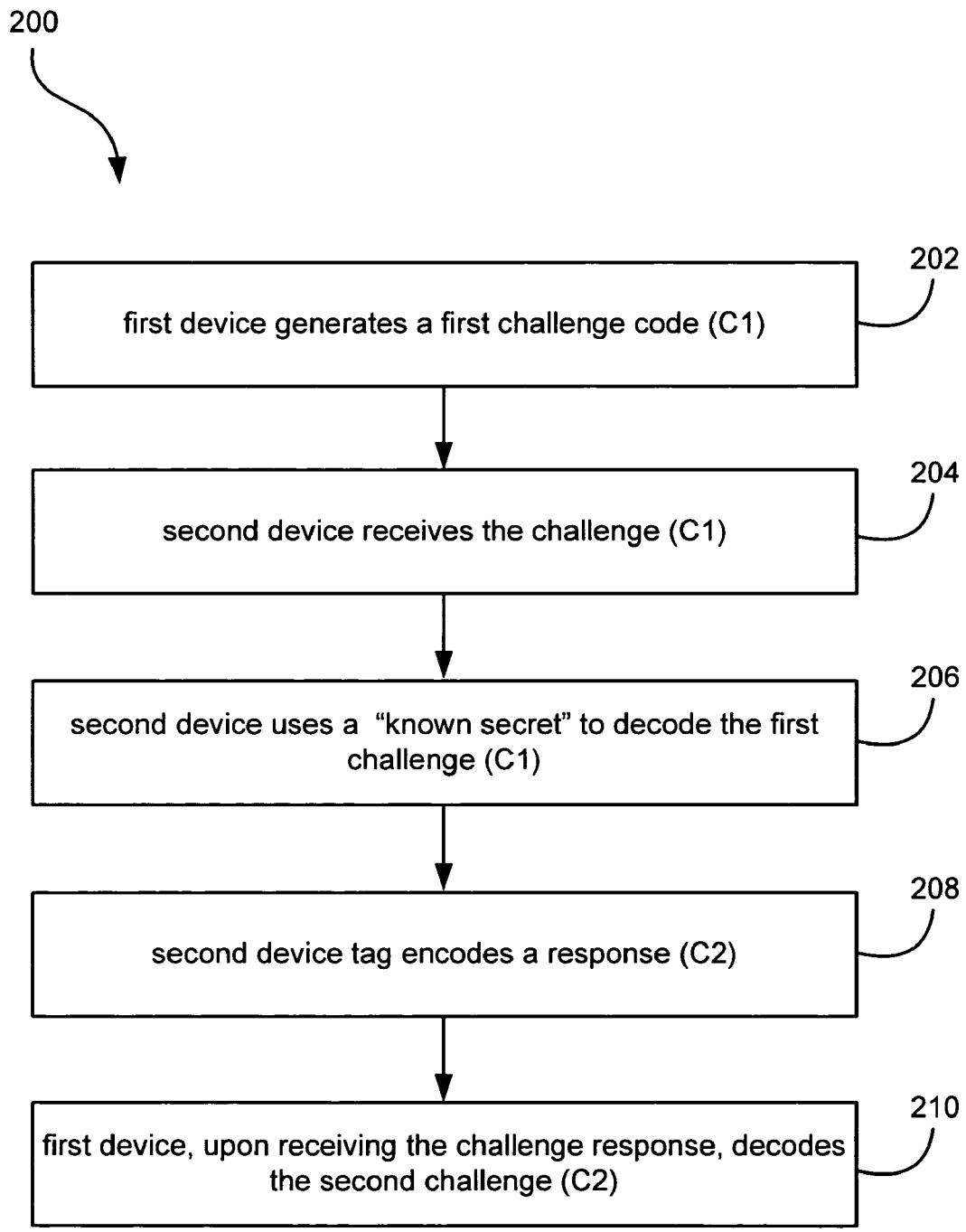
FIG. 2 is a flow diagram of a method for simple, secure exchange of random numbers according to one embodiment.

A first embodiment provides a process for simple, secure exchange of random numbers. FIG. 2 is a flow diagram of a general overview of the method 200. In operation 202, a first device, e.g., a reader generates a first challenge code (C1). In operation 204, a second device, e.g., a tag, receives and decodes the challenge (C1) using a "known secret." In operation 206, the tag uses this "known secret" to decode the first challenge (C1). Using this decoded secret, the tag encodes a response (C2) in operation 208. In operation 210, the reader, upon receiving the challenge response, decodes the second challenge (C2) and retrieves the tag's secret.

The "known secret" can be a secret code (e.g., sequence of bits) and herein referred to as a "password" known to both the reader and tag. To share the password, the tag can be initiated in a known, secure environment and loaded with the password so there is almost no chance of the password being captured by a third party. Preferably, each tag has a unique password, which can correspond to the serial number of the tag, etc. For instance, the manufacturer of the tag can set a password for each tag. A subsequent purchaser can enter the original password, and rewrite the tag with new password, thereby allowing the current owner to control ownership of each tag. The tag can be configured to not function in secure mode until the proper password is presented.

The reader is also loaded with the passwords for each tag anticipated to be in communication with the reader. Note that because the reader is typically more complex than the tags, the reader can at any time download the passwords from a computer, the internet, a wireless link to a remote source, etc.

Figure 3:
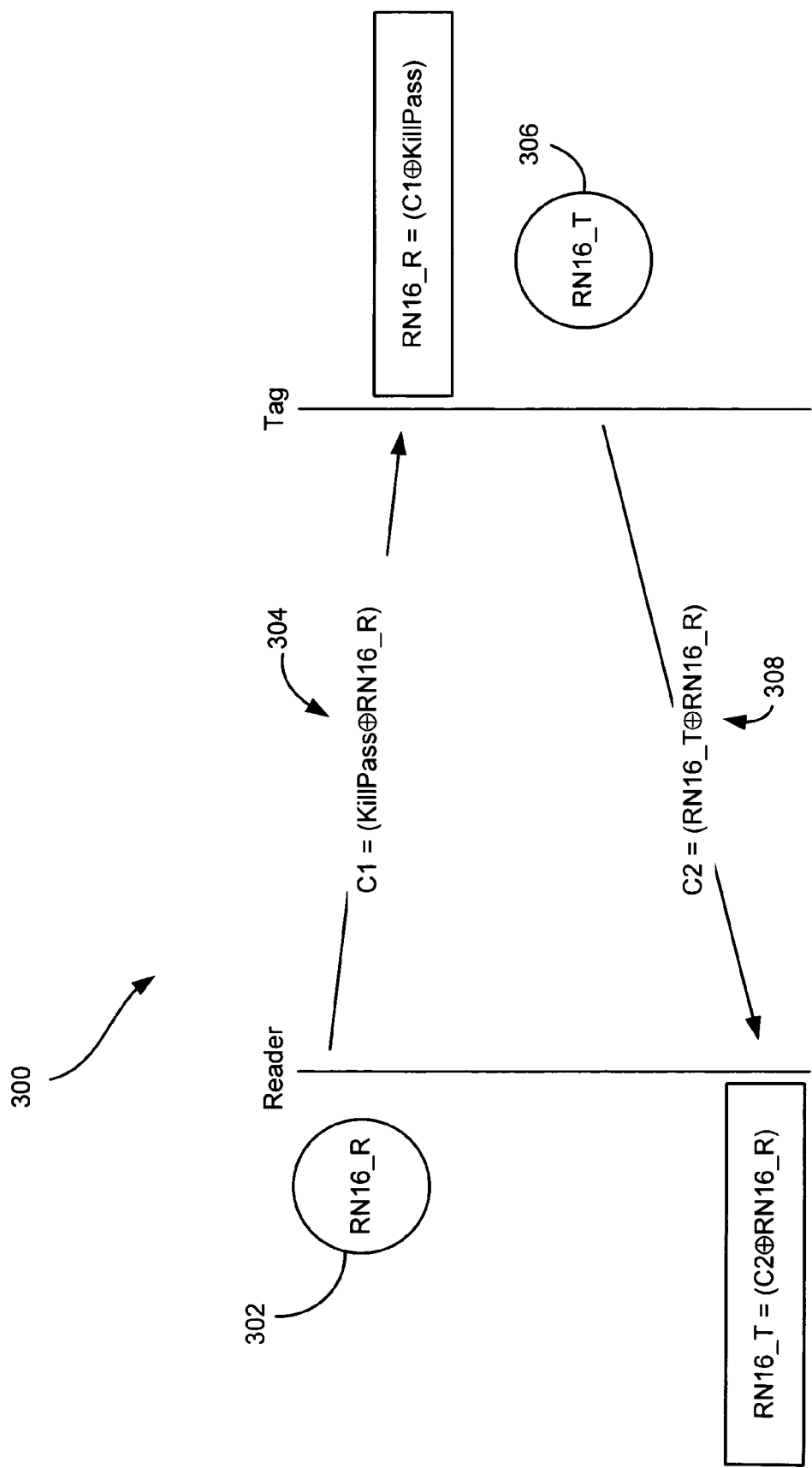
FIG. 3 is a flow process of an illustrative sequence of events in a process for simple, secure exchange of random numbers according to one embodiment.

FIG. 3 graphically depicts an illustrative sequence of events 300 in a process for simple, secure exchange of random numbers. The reader generates a first random number 302 locally. In this example, the random number 302 is a 16 bit random number (RN16_R), but can be of any size. One skilled in the art will understand the increased processing requirements that accompany random numbers of increased size.

One way to generate a 16 bit random number is to spin an oscillator having 16 states and stop at random to create, for example four random bits. This may be repeated as necessary to generate 16 or more seedless numbers. While RN16_R can be generated by any suitable mechanism, because the reader is more complex than the tag, i.e., more capable than the tag, the reader can generate a random number that is of higher quality (cryptographically) than that generated by the tag. Preferably, the random numbers are not generated from a seed, as an imposter could potentially cause the tag or reader to restart, which would start the sequence over again and the password could be extracted by "brute force" analysis of the repeating sequences.

The reader then Exclusively OR's ("XOR's") the first random number (RN16_R) with a password corresponding to the particular tag to be communicated with to generate a first challenge code (C1) 304, where:

$$C1=(RN16\_R \oplus KillPass(31:16))$$

In this example, the password is a 32 bit Kill password upper half (31:16), but can be of any suitable size and content per the desires of the programmer.

Exclusive ORing is preferred because it provides good security but can be implemented with only four transistors per bit. This simplicity makes the disclosed method very suitable for RFID tags, in that the processing circuitry can be minimized. Exclusive ORing provides good security in that any number XORed against a random number is indistinguishable from a larger random number, i.e., the data (RN16_R and KillPass) in the XORed challenge is effectively hidden. To put it another way, scrambling the random number with a password hides both the password and the random number itself.

The reader then transmits the first challenge code (C1) 304 to the tag.

The tag receives the first challenge (C1) 304 and uses its copy of the Kill password MSB half to decode C1 by performing an inverse XOR function on the first challenge:

$$RN16\_R(@Tag)=(C1 \oplus KillPass(31:16))$$

The tag generates a random number (RN16_T) 306, either before or after receiving the first challenge (C1) 304. The tag then combines this second random number (RN16_T) 306 with the decoded first random number (RN16_R) from the reader in the first challenge (C1) 304 using an Exclusive OR function to generate a second challenge (C2) 308:

$$C2=(RN16\_R \oplus RN16\_T)$$

The second challenge code (C2) 308 is then transmitted to the reader.

The reader receives the second challenge (C2) 308 and uses its previously generated random number (RN16_R) 302 to perform an inverse Exclusive OR on the challenge (C2) 308 and retrieve the tag's random number 306:

$$RN16\_T(@RDR)=(C2 \oplus RN16\_R)$$

Note that the exchange does not necessarily need to be performed in the order set forth above. For instance, the tag could generate its random number (RN16_T) 306 prior to receiving the first challenge, etc.

Now the reader has a secure version of the tag's RN16_T 306 and the tag has a secure version of the reader's RN16_R 302. Additional exchange cycles may be completed to exchange "larger" blocks of data using new versions of the random numbers from the reader and/or the tag. More information on such exchanges shall be set forth below.

Additionally, because the reader is more capable than the tag, the random number (RN16_R) from the reader can be cryptographic in nature (higher quality) while the random number (RN16_T) from the tag doesn't have to be (i.e., can be a pseudo random number, a random number based on a seed, etc.) because the tag's random number (RN16_T) is encoded with the higher quality cryptographic number (RN16_R) and is therefore much more secure. In other words, the high quality random number from the reader protects the lower quality random number from the tag. However, it is preferable that the tag also generate as high a quality of random number as possible.

This exchange protocol requires only the addition of a reader RN16 and in some cases, an exchange command. Additional commands may be used to exchange portions of the protocol in some specifications. Note that this exchange protocol does not rely on a KillPassword, but on "some" secure token. Other tokens could be used as well, including a token for the express purpose of the exchange protocol.

The process set forth above thus provides a mechanism for secure data transmission. There are a number of ways to attack a system. Typical examples include use of a rogue reader, use of a rogue tag, acting as a man in the middle which reads the information and gains experience, and denial of service.

The easiest way to break a code is to control the sequence, because then an imposter can repeat portions of the sequence over and over again, extract information from the repeating sequence, then use that information to break other parts of the code until ultimately the imposter learns how to decrypt the data and even communicate with the reader or tag directly. For example, assume a random number only came from the reader. Then theoretically, an imposter tag would have a hard time breaking the sequence because nothing repeats. If the tag does not have the password, it could not break the sequence. If the imposter tag tried to break it, the exchange starts with different random number, and would have a different sequence. So there is no consistency as to what would happen. Now assume an imposter reader is attempting to break the sequence. Because the reader is the player supposed to generate a random number, the imposter reader would generate the same number over and over to query the tag. From the tag's responses, the password can be extracted.

Because the process described above uses two random numbers (one from the reader and one from the tag), no imposter, whether tag or reader, can achieve a consistent result because the exchange always includes a random number from the other side. Thus, an imposter can never control the exchange, as the randomness cannot be removed from the process because some of the randomness is from reader and some is from tag, and the process cannot be forced to repeat itself.

Simple Secure Tag/Reader Authentication Using Cyclical Redundancy Checks (CRCs)

There has thus far been presented a system and method where if the password is correct, an exchange can happen. If either the tag or reader is nefarious (i.e., uses the wrong password), the exchange fails, nothing happens, and the password remains safe.

Building on the above, it is desirable to authenticate the exchange to ensure that the tag or reader is who it claims to be rather than an imposter. To that end, the present invention is also capable of verifying that the challenges are authentic, i.e., have not been modified by an imposter. Particularly, the present invention calculates and adds a CRC to the packet to ensure that the correct random number was received. So instead of having a pure random number where any result would be acceptable to the tag, a CRC is added so that only the original random number will match the CRC value.

Imagine a scenario in which the wrong reader sends a random number XORed against a password. The tag uses its password, which is does not match the reader's password, but extracts what it thinks is the correct random number. The passwords don't match so the tag stops. The point is, the tag has no way of knowing whether it is talking to right reader and doesn't know it has the right random number or not. By adding a CRC on the random number, the tag can verify that it has received the proper random number. If the CRC indicates that the tag has received a good packet, the tag will know it is communicating with the proper reader (authentication) rather than a nefarious reader.

The process can be repeated for the return transmission. The tag can generate a CRC for its own random number, XOR it with the tag's random number, and send back a second challenge containing a CRC. When the packet comes back to the reader, the reader can confirm it has received the proper random number, which will only occur if the tag had the password, had properly decoded the readers random number, and the CRC matches.

CRCs and XORs are easy to implement in hardware, so this new process is ideal for RFID systems.

Figure 4:
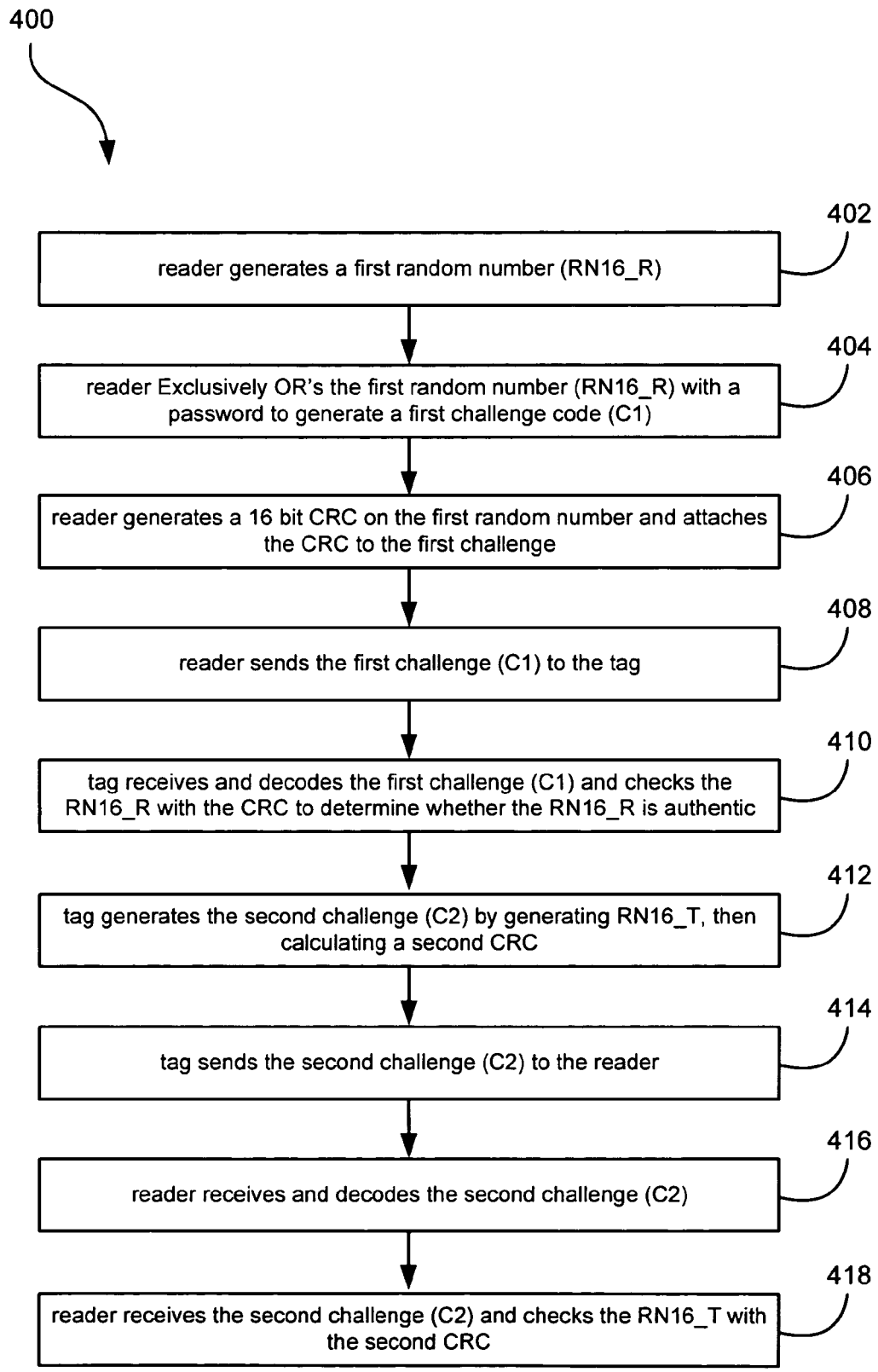
FIG. 4 is a flow diagram of a method for simple, secure exchange of random numbers with CRC verification according to one embodiment.

FIG. 4 depicts a process 400 in which CRCs are added to the exchange. Again, it should be noted that the order that the operations are performed is not critical and can be varied where not dependent upon a prior operation. In operation 402 the first device, e.g., reader, generates a first random number (RN16_R). In operation 404, the reader Exclusively OR's the first random number (RN16_R) with a password to generate a first challenge code (C1). In operation 406, the reader generates a 16 bit CRC on the first random number and attaches the CRC to the first challenge:

$$C1=(RN16\_R\oplus KillPass(31:16), CRC(RN16\_R))$$

Note that the CRC can be of any suitable number of bits.

Alternatively, the reader can generate a 16 bit CRC on a combination of the first random number and the password. The combination can be merely be a sequential combination of the random number and password as in:

$$C1=(RN16\_R \neq KillPass(31:16), CRC(RN16\_R+Kill-Pass))$$

or vice versa. The combination could also be the result of XORing the random number and password, as in:

$$C1=(RN16\_R\oplus KillPass(31:16), CRC(RN16\_R\oplus KillPass))$$

The reader then sends the first challenge (C1) to the second device, e.g., tag, in operation 408. In operation 410, the tag receives and decodes the first challenge (C1) and checks the RN16_R with the CRC to determine whether the RN16_R is authentic, i.e., has not been modified by an imposter. If the CRC doesn't match the RN16_R, the tag will not accept the challenge (C1).

In operation 412, the tag generates the second challenge (C2), and calculates and attaches a CRC of the tag's random number to the second challenge (C2):

$$C2=(RN16\_R\oplus RN16\_T, CRC(RN16\_T))$$

In operation 414, the tag sends the second challenge (C2) to the reader. In operation 416, the reader receives and decodes the second challenge (C2). In operation 418, the reader receives the second challenge (C2) and checks the RN16_T with the second CRC. If the CRC doesn't match the RN16_T, the reader will not accept the challenge (C2).

For subsequent data transmissions protected by random numbers, the reader and tag can continue to use CRCs to authenticate the transmissions.

In a variation on the above, the reader can combine the CRC with its random number (RN16_R) prior to XORing with the password. Similarly, the tag can combine the second CRC with its random number (RN16_T) prior to XORing with the reader's random number (RN16_R) or random number plus first CRC. These would create an even larger number, which would be harder to decode by a nefarious party. In other words, to the extent that a random number is not truly random, it would eventually be possible to determine the password. However, by running a CRC on the random number, the CRC on the random number is near random itself and so would require even more processing power and time to break the encryption.

Now a level of authentication has been added to the exchange.

Circuit Implementing Random Numbers for Secure Data Exchange

Figure 5:
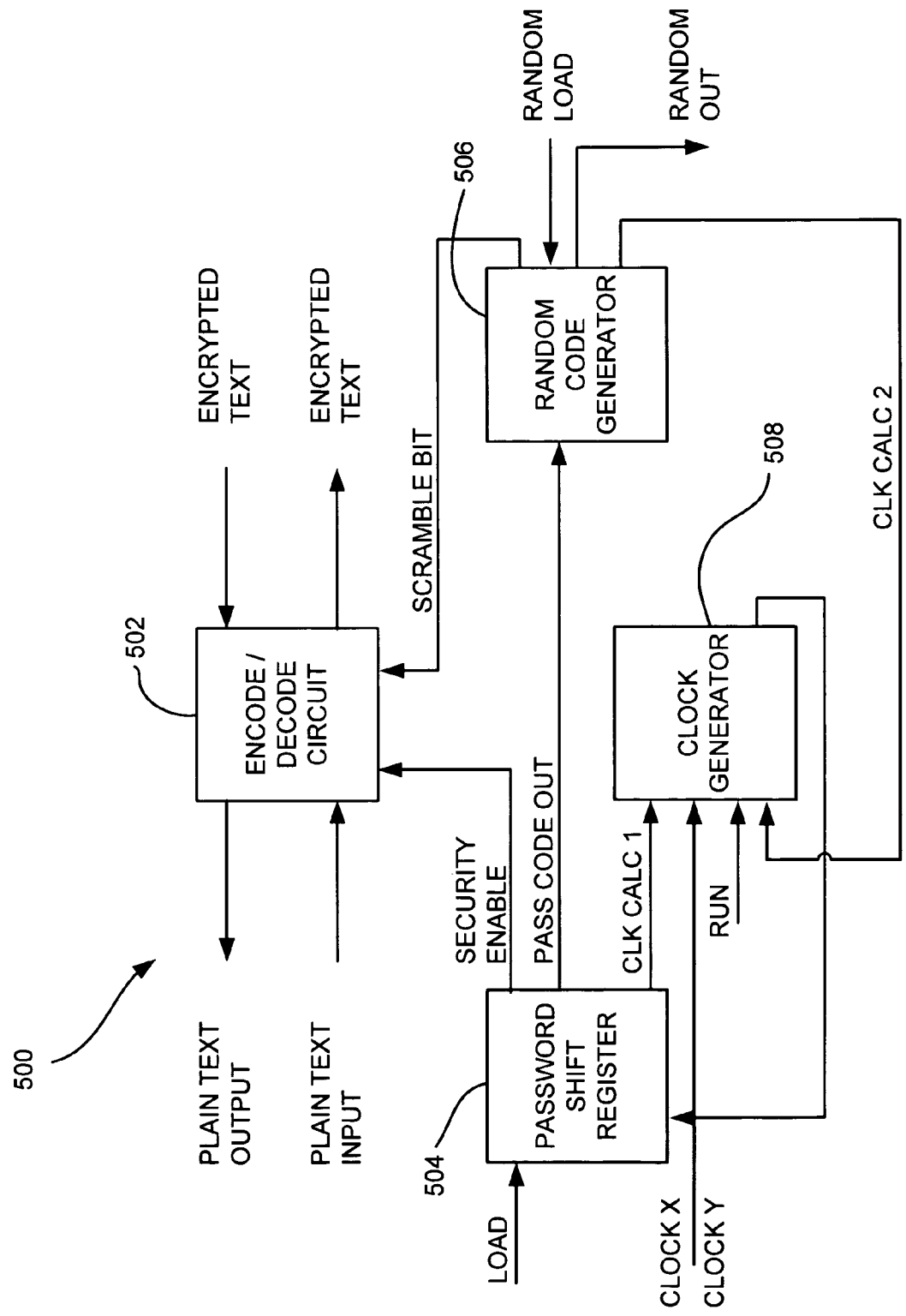
FIG. 5 is a top level block diagram of a security circuit according to one embodiment.

FIG. 5 is a top level block diagram of a circuit 500 that will take a plain message and using the methodology described herein, encode the message into a ciphered message. This ciphered message may then be transmitted to the receiver in a non-secure method. At the receiving end, the same algorithm is applied to the cipher message to convert it back to a plain message. This circuit can be implemented in under 1000 gates, and potentially under 400 gates.

Again, this example is not intended to be an exhaustive description of each potential configuration, but to show how one potential circuit may be configured. Variables may have initial conditions, which when chosen, have better results than other initial values. These variables and configurations are for illustration purpose only, and do not suggest the only values which may be utilized.

The circuit 500 includes four blocks: an encode/decode block 502, a password shift register block 504, a random code generator block 506, and a clock generator block 508. The encode/decode block 502 is responsible for the actual conversion from plain message to cipher message in both the forward (transmitting) and the backward (receiving) directions. It uses as inputs the plain information and outputs encrypted text if the security enable is active (i.e. asserted). In the reverse direction, the block takes as input, encrypted information and if security enable is asserted (i.e. active), decrypts the information. Additionally the encode/decode block 502 requires the input "scramble bit". which is used to encrypt or decrypt information.

The password shift register block 504 holds the "secret" password. For discussion purposes a size of 32 bits has been selected for this secret password. This secretly generated value is loaded into the security circuit in a secure method. This is the "hidden key." This block also includes a pass clock, and a password load signal. The password shift register 504 produces a security enable signal, a clock calculation bit, and an intermediate pass code out value. The pass code out signal is used in further calculation of the encryption algorithm.

The random code generator block 506 loads the reader RN16 and the tag RN16 values. For discussion purposes a size of 32 bits has been selected for this random number key. The important fact of this value is that to create the full key, a portion of the random key is determined by each entity. For the purposes of discussion, we limit the number of entities to two, and further described them as transactor A and transactor B. In this case, each transactor (A and B) would provide some portion of the RN key, which when combined create the RN key. For illustration, we allow each transactor to provide 50% of the key or 16 bits each. As with the password shift register 504, a load signal is also present. The product of the random code generator 506 is the scramble bit and clock calculation bit. It is also preferred that a known number of periods, e.g., ≧128, be applied to this system prior to actual use to encrypt or decrypt text in block 502. This initialization period must be a synchronized number of cycles known and agreed upon by all transactors involved in this secured communication.

Figure 6:
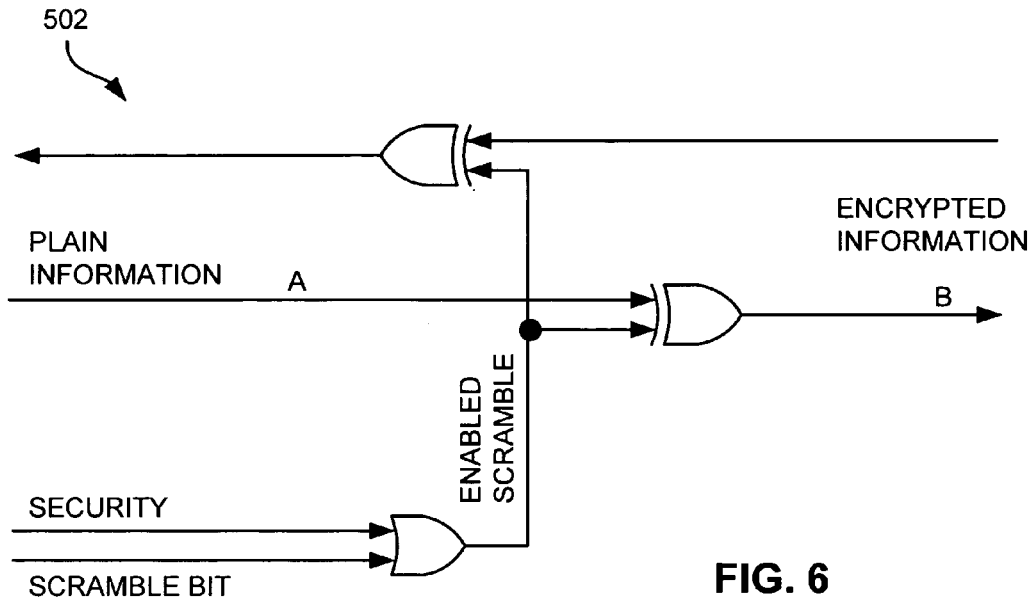
FIG. 6 is a top level diagram of the encode/decode block of the circuit of FIG. 5.

FIG. 6 is a top level diagram of the encode/decode block 502. The encode/decode block 502 is comprised of two directions: in and out. Both directions have the need to encrypt and decrypt the incoming or outgoing information. In creating cipher information from plain information, going from the left hand side of FIG. 6 to the right hand side, plain information is presented on incoming signal A. The signal A is combined with the enabled scramble bit using an Exclusive OR function. If the scramble bit is not asserted or the security enable bit is unasserted, the plain information is passed from the input (A) to the output (B). When Security is enabled (asserted) and the scramble bit is also asserted the value of A is XORed with A, effectively inverting the output state at signal B. (See Table 2).

TABLE 2

XOR truth table

| Signal A (in 1) | Enabled scramble bit (in 2) | Signal B (out) |
| --- | --- | --- |
| 0 | 0 | 0 |
| 0 | 1 | 1 |
| 1 | 0 | 1 |
| 1 | 1 | 0 |

This effectively scrambles or encrypts the information because the calculated value of the enabled scramble bit is unknown by third party observation of the output signal B. It is the calculation of the scramble bit which provides the security algorithm. Without knowing or being able to calculate the scramble bit, the encrypted information is secure. The converse is also true. By using the calculated value of the enabled scramble bit, the incoming signal can be correctly decrypted. Because the scramble bit is calculated the same way by both transactors (transactor A and transactor B), each is able to encode and decode the encrypted information. Care must be taken when applying information to either the right hand side or left hand side for encryption or decryption, to provide only valid information while the run signal is asserted or during active encrypt or decrypt periods. Run should be asserted once for each new value of the incoming information such that it generates one value of outgoing information. Synchronization between the sending transactor and receiving transactor require information and the run signal to operate in a one for one manor (i.e. each run period should be applied to the next single value of information). For purposes of this discussion, the term Data Clock will apply to this period. Therefore, for each Data Clock period, a new value of scramble bit and a new value of incoming information need to be present when the run signal is asserted (active). No information is translated from encrypted to decrypted (or visa versa) during periods when run is inactive. Run may remain inactive for an unspecified number of Data Clock periods.

Figure 7:
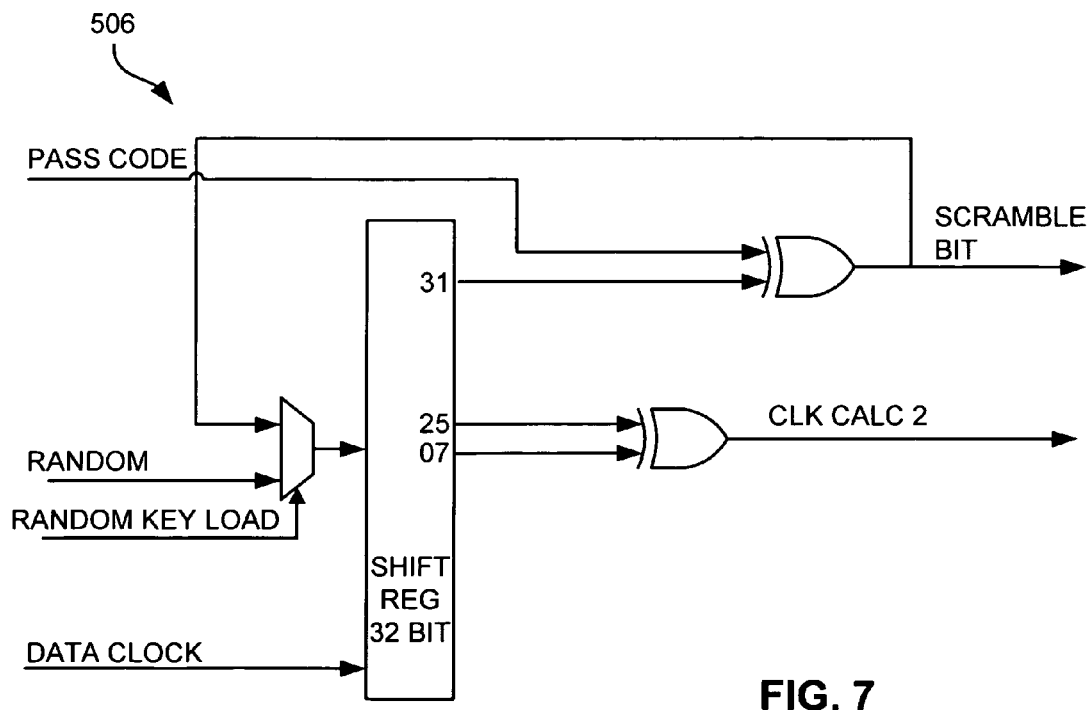
FIG. 7 is a top level diagram of the random code generator block of the circuit of FIG. 5.

FIG. 7 is a top level diagram of the random code generator block 506. The random code generator 506 creates the scramble bit signal. This block is initially loaded and "seeded" with the RN key, by preloading the shift register to initialize the algorithm. Some portion of this code comes from the local transactor and some portion from the remote transactor. It is combined in a known and synchronized fashion creating the RN key which is then loaded into the random code generator's shift register. The shift register is then clocked or run for a known number of cycles, thus, initializing the encryption algorithm. At this point the random code generator 506 is ready to help calculate the scramble bit to encode or decode information.

The shift register shown in FIG. 7 is 32 bit. The 32 bit value was selected for illustration purposes only. Larger or smaller sizes may be used.

For each Data Clock the shift register moves in a left shift direction, making bit 0 the new bit 1, the old bit 1 the new bit 2. This is a logical left shift operation. This continues until all bits are exhausted or all Data Clock periods cease. The most significant bit (MSB), bit 31, is pushed off the end of the shift register and is discarded. In order to not run out of incoming bits, the scramble bit is loaded into the shift input, and on the next period becomes the new bit 0.

The other signal which is important is the Clk Calc 2 signal. By using two bits from the shift register and combining them using an XOR function, the Clk Calc 2 signal is created. This signal then goes to the clock generator circuit 508.

Figure 8:
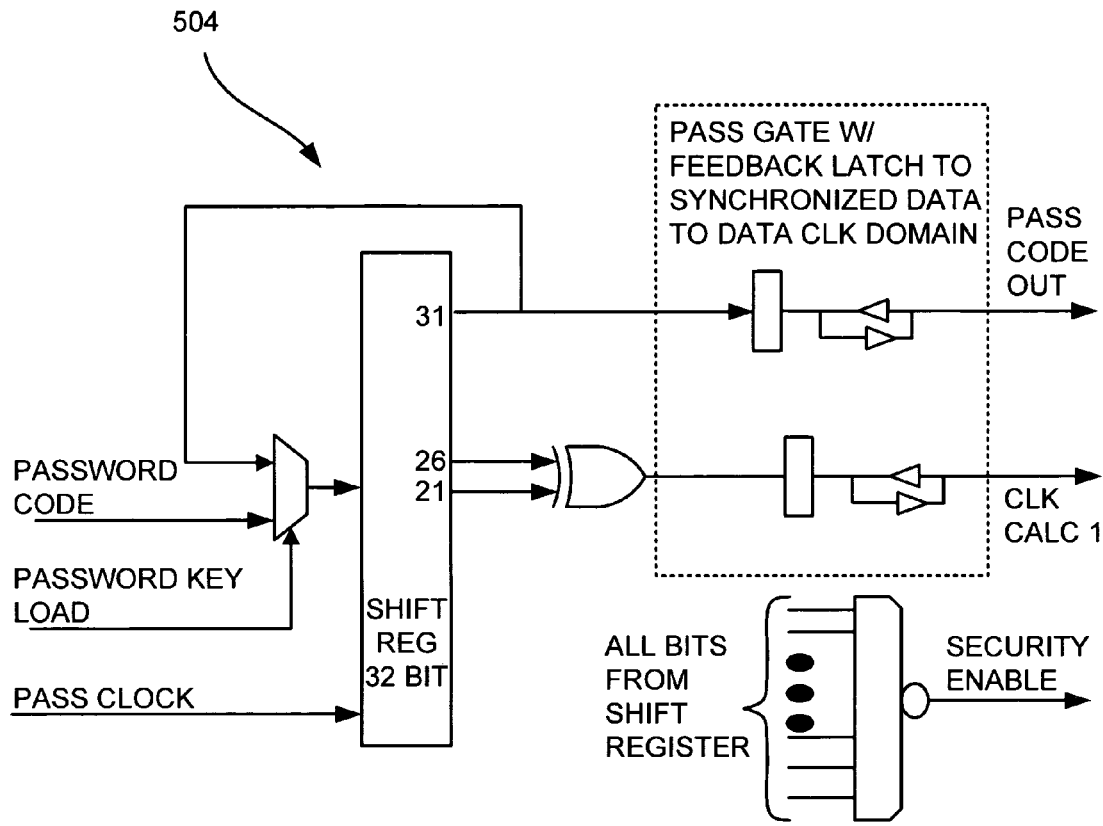
FIG. 8 is a top level diagram of the password code generator block of the circuit of FIG. 5.

FIG. 8 is a top level diagram of the password shift register block 504. The password shift register 504 works in much the same manner as the random code generator 506 with a few exceptions. First, the MSB of the shift register is not discarded, but a circular shift is performed. This means that the MSB bit is loaded, on the new period, into the least significant bit (LSB). This is the normal operating mode.

The initial value for the password shift register 504 does not come from a combination of transactor keys, but from a secured valued preloaded in some manor which does not compromise the security of the shared password (secret key).

Additionally the shift register in the password shift register 504 operates using PASS CLK and not the Data Clock. This allows known variations and relations to be used to operate each shift register, with the potential desire to run each clock at related but different rates.

If a value of all zeros resides within the shift register the security enable bit is then unasserted and the encryption/decryption of information is disabled. The use of two shift register bits is used to create the Clk Calc 1 signal in a manner similar to the Random Code Generator block 506.

The password shift register 504 creates the PASS Code out signal based on the MSB from the shift register. Because of the potential of multiple clock domains, some amount of synchronization, of this signal, is required. If PASS Clock and Data Clock are different, non-phase locked clocks, this could potentially create a metastability case between the two domains. Synchronizing of the PASS code out signal is required for the Data Clock domain.

Figure 9:
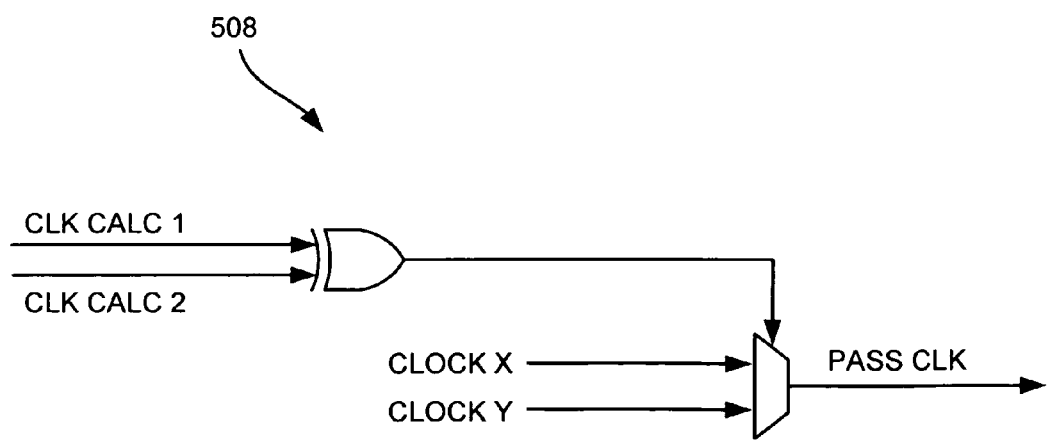
FIG. 9 is a top level diagram of the clock generator block of the circuit of FIG. 5.

FIG. 9 is a top level diagram of the Clock Generator block 508. This block 508 creates the PASS Clock used by the password shift register 504. It also controls the DATA clock for the random code generator 506. Proper implementation is required and care must be taken in its implementation of this section, to follow good clock design practices. Selection of clock frequency is determined by the Clk Calc1 and the Clk Calc 2 signals. The two signals Clk Calc1 and Clk Calc2 are combined (in this example a simple OR function is used) and selected from potentially different generated clocks to supply as the PASS Clk.

Based upon a system reference clock, Clock X and Clock Y may be at different frequencies. The frequencies may be related or have a directional component, or vary with the direction of data transfer between the reader and tag. A related clock would be some multiples of the system reference clock. If for example the system clock runs at a high rate, Clock X may divide the system reference clock by a value X while the Clock Y period may divide the system reference clock by a factor of Y. For example, if the system reference clock is 2 Mhz, then a divide by 2 would yield a Clock X of 1 Mhz and a divide by 4 would yield a Clock Y of 500 Khz.

If the communication link is not symmetrical (that being the information from transactor A to transactor B travels at a rate M, and transactor B to A at a rate of N) periods of Clock X and Clock Y may correspond to these transmission rates or frequencies. If different, it further confuses the casual observer, by also adding a component of directional duration into the calculation of the encryption algorithm. For example, if the forward direction (transactor A to transactor B) runs at a rate of 160 Khz, and the reverse direction (transactor B to transactor A) run at a rate of 8 Khz, then these values may be used for the periods of Clock X and Clock Y respectively.

Figure 12:
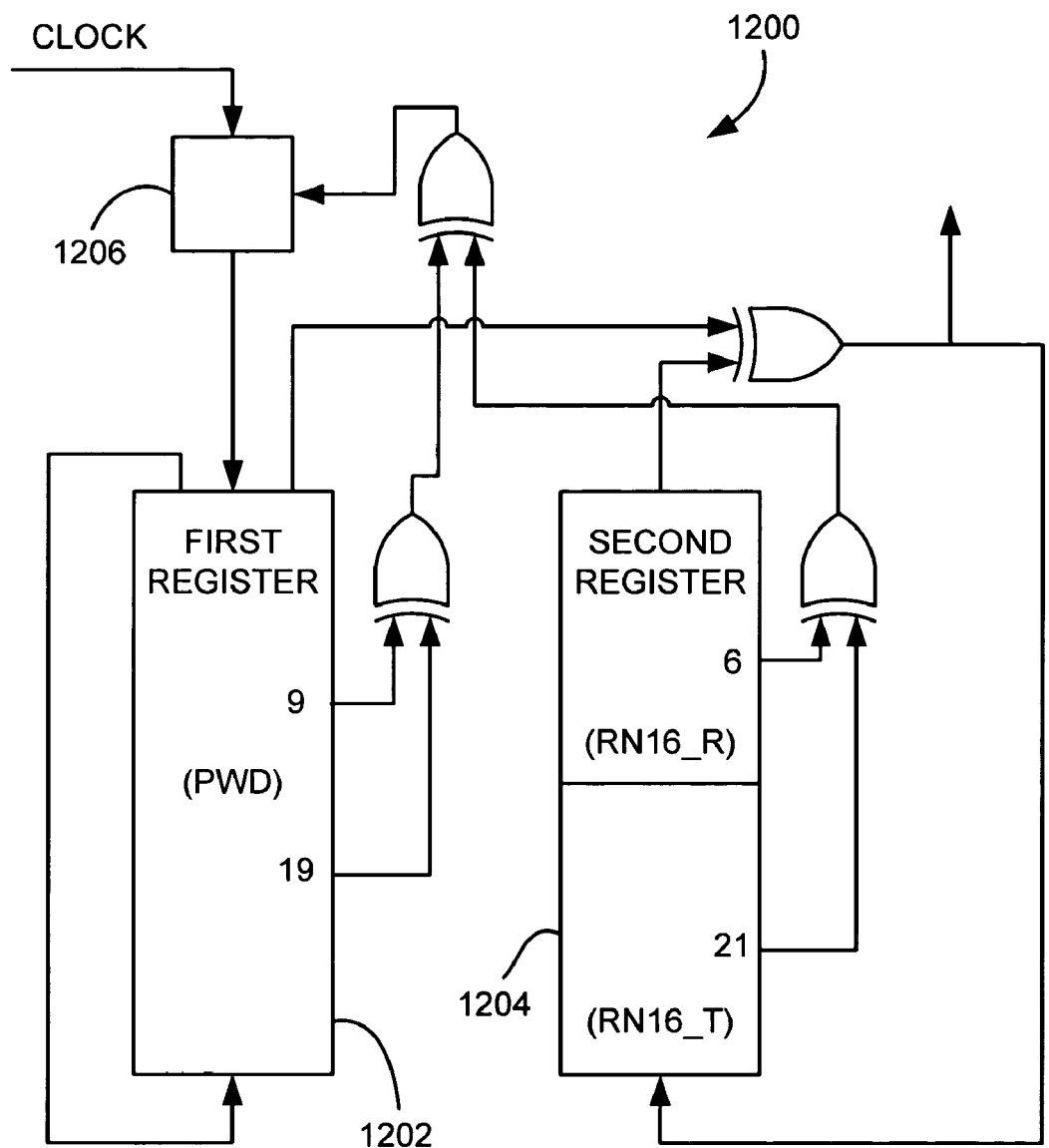
FIG. 12 is a simplified diagram of a circuit for generating DES coding with variable cycle offset.

From the above sections, Clk Calc 1 and Clk Calc2 are generated based upon the selected bits of the individual shift registers. By combining these bits using an XOR function, random, but calculated values are generated. These values are then combined (using an XOR function) to select between different clock frequencies for shifting the Password Code shift register. By shifting the register in a pseudo random order, random to the uninformed casual observer, a high level of security is maintained. FIG. 12 and associated description expand on this concept.

Additionally, shifting of the Password Code shift register can be halted altogether, periodically or irregularly, to further improve encryption. For instance, the clock generator 508 could include a circuit that halts the clock when Clk Calc 1 or Clk Calc2 include a particular sequence of bits. The starting and stopping affects how the data output from the registers is XORed, making the sequence based on the numbers more complex, i.e., harder to break.

It should also be noted that the rates at which the password code generator shift register and the random code generator shift register operate may be selected in a number of different fashions. One option is to use pre-determined, calculated values, such as valued divided down from a system reference clock, or requiring a different or the same value for both clocks. Another option is under the direction of a non-symmetrical communication link, where the transmission of the transmit clock period differs from the receive clock period. These clock periods may be used for shift register clock rates. A combination of these can also be implemented.

As part of the initialization of the clocks, shift registers, and "scrambling" the initial choices for key codes, a number of cycles should be run. This effectively scrambles the information contained within the two shift registers.

Figure 10:
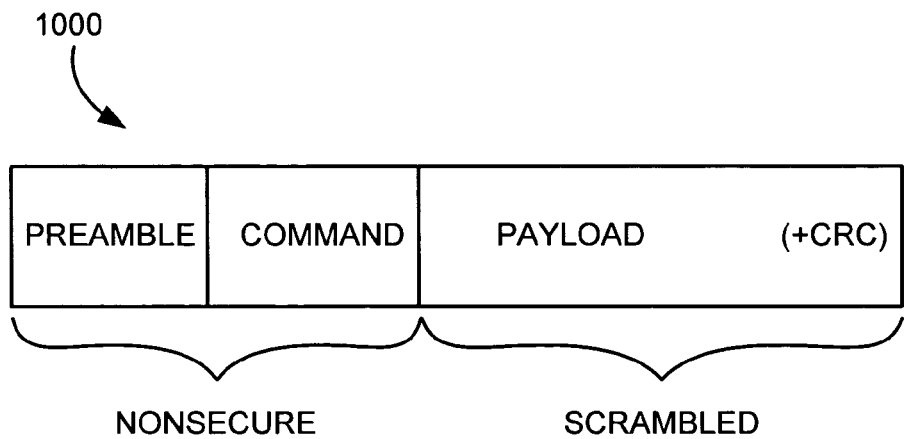
FIG. 10 is a graphical depiction of a packet of data.

Method and Circuit to use reader Random Number and Tag Random Number+Password to Generate Seedless Pseudo-Random Numbers FIG. 10 illustrates a packet of data 1000 transmitted between the transactors, assumed here to be a reader and a tag. Each packet includes a preamble, a command (e.g., 8 bit command), and payload. The preamble, for example, tells the tag to spin up its oscillator to a certain frequency and then start. The command instructs the tag to perform some function such as a read, write, acknowledge, select, send, etc. the payload can be any type of data desired to be transmitted, retrieved, CRC, etc. The length of the command or preamble can also be used to indicate the type of encryption. For instance, an 8 bit command indicates one type of encryption, while a 9 bit command indicates another type of encryption. The net result is that the time to decrypt the data can be reduced as the receiving device can determine which type of encryption to apply. This also enhances overall security by further increasing the apparent randomness of the exchange.

The payload can include passwords and other data, which are sent encrypted using the methodology presented herein. The preamble and command are nonsecure, i.e., transmitted in unencrypted form, so security in the recipient is bypassed. However, the payload is encrypted. As mentioned above with reference to FIG. 6, a bit (0) in the command turns security off for the command portion. However, the payload data itself is used to enable or disable security for the payload portion. The scramble bit appears to the plain eye as random. As long as it is synchronized at the reader and tag, the security method functions properly.

Every time a secure link is initiated, and security is enabled, new random numbers are generated. To initiate communication between the tag and reader, the reader queries the tag for its identifying information. The tag sends back its identifying information and the reader selects the password associated with that particular tag. The exchange process then starts as set forth above. The reader indicates that it wants to initiate a secure transaction. The reader sends its 16 bit random number (RN16_R). The tag acknowledges the command and sends back its 16 bit random number (RN16_T). The random numbers are loaded in registers. The reader sends a command with a scrambled payload, which may or may not include a CRC. If the payload is not successfully descrambled, or the CRC doesn't match the associated data, the tag won't respond. If the payload is successfully descrambled, a series of communication exchanges occurs.

Figure 11:
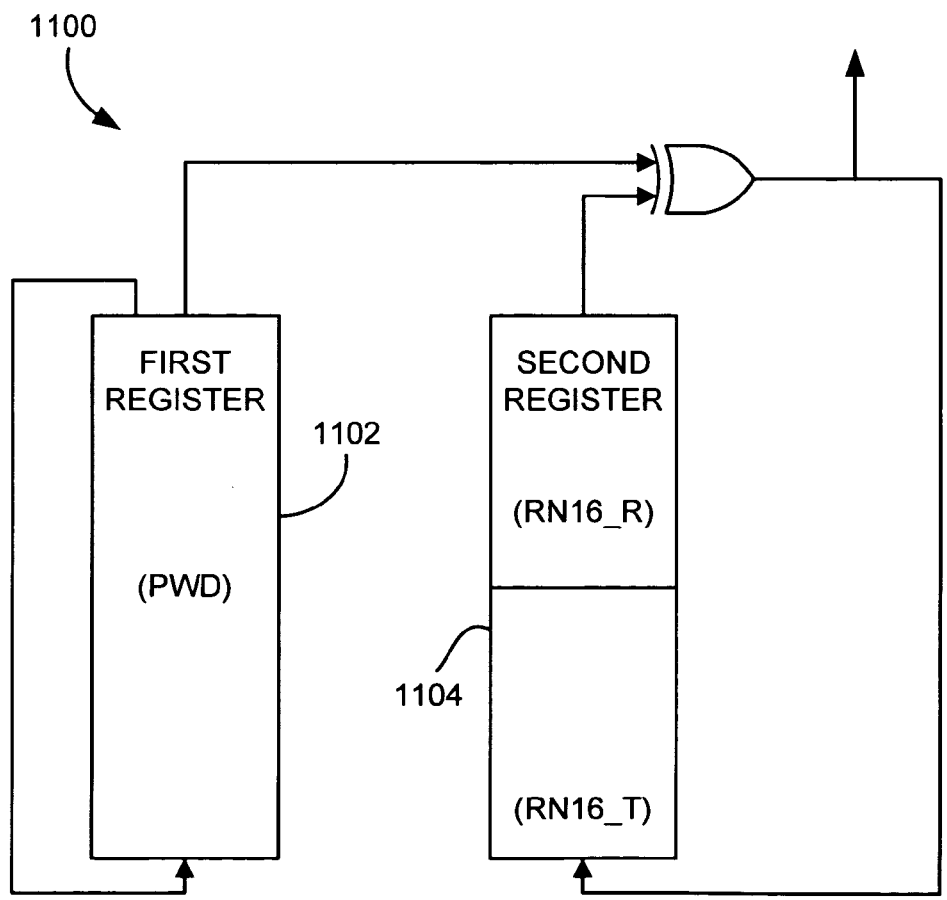
FIG. 11 is a simplified diagram of a circuit for generating pseudo-random numbers.

FIG. 11 is a simplified diagram of a circuit 1100 for generating pseudo-random numbers. The reader and tag each have two 32 bit shift registers 1102, 1104, similar or the same as the registers shown in FIGS. 7 and 8. The first register 1102 contains the 32 bit password. The second register 1104 is loaded with the 16 bit RN16_R and 16 bit RN16_T. Next, a sequence is generated from the original random numbers and password. However, if the registers merely used the password and the same random numbers, shifting a bit each cycle, the sequence would repeat every 32 cycles. To avoid this, the random numbers are essentially only used once. In the first cycle, the output of the registers 1102, 1104 are XORed, and the result is output for transmission to the other device, but is also fed back into the second register 1104. In the next cycle, the (shifted) password in the first register 1102 is XORed with new number in the second register 1104 (result of previous XOR cycle). Thus the number in the second register 1104 is always changing so the sequence becomes long and complicated, i.e., impractical to break. In other words, an essentially nonrepeating sequence is generated. Each machine generates the exact same sequence so communication can take place.

Because the sequence begins with a known password and random numbers, it is not truly random, but rather is pseudo random. The sequence is seedless, because it begins with random numbers each cycle, the new random numbers being the result of the previous XOR function. Each time a sequence is started with a new random number, the seed changes and so the behavior of the sequence is unpredictable. Thus, the sequence appears to be completely random.

Method and Circuit for Generating Data Encryption Standard (DES) Coding with Variable Offset of Number of Cycles Controlled by all Three of Password, Reader Random Number, and Tag Random Number FIG. 12 illustrates a circuit 1200 for generating DES coding with variable cycle offset. DES coding generally includes the steps of taking a key and another number and XORing them in a first cycle. In the second cycle, the result from the first cycle is XORed against the key again. In the third cycle, the result from the second cycle is XORed against the key again. This is repeated for several cycles. The more cycles, the harder the encryption is to break. However, more cycles require more processing time. So there is a cost/speed trade off. Further, DES coding can be broken by using pairings of data and breaking the sequence cycle by cycle. Therefore, it would be desirable to create both a large number of cycles, and a variable number of cycles. The cycles should be irregular, e.g., not the same length.

Referring again to FIG. 12, a first register 1202 stores the password, and the second register 1204 stores the random numbers. Bits of information are extracted from the password and XORed with each other. Also, a bit from the RN16_T and a bit from the RN16_R are XORed. Then the results from XORing the password bits and random number bits are XORed. This result is fed into a clock generator 1206 to set a logic state of the generator 1206. In one state, the clock generator 1206 allows the clock signal to pass to the first register 1202. In the other state, the clock signal is blocked. The result is that the first register 1202 operates sporadically, typically at one half the rate as the second register 1204 (which operates continuously). Thus a staggered effect is created, and it is nearly impossible to back out the sequence.

To further enhance the encryption, one of the registers can be attached to a 2X, 3X, etc. clock.

As long as the receiving hardware has the password and the initial random numbers, the receiving hardware can reverse XOR the data to extract the data rather simply.

X Number of Precycles Prior to Outputting Data to Scramble

As mentioned above, a number of cycles with no output at all should be run as part of the initialization sequence to effectively scramble the information contained within the two shift registers. For example, 128 cycles can be run before allowing output, but can be any number of cycles. Even if a hacker tried to go back and extract the data, he or she would be missing the key 128 cycles. In the case where the random number register is always changing because it is being fed the XOR result of the first and second registers, and the clock is varying from the XOR staggering function on selected bits of the registers, the sequence is even more complex.

There has thus been described a security method and circuit that is simple to implement in hardware (e.g., 64 shift registers, <1000 transistors), and requires very little power. Data can be transmitted in parallel to operation of circuit, so speed is high.

Master Tags

RFID tags can be structured in a hierarchy, where higher level "master" tags contain information about tags in a lower level. As mentioned above, a tag can store data, which it can transmit as part of the payload of a data packet. The data can include information such as passwords about other tags, which can be sent encrypted using the above-described method. In this way, the master tags can physically follow the lower level tags.

Figure 13:
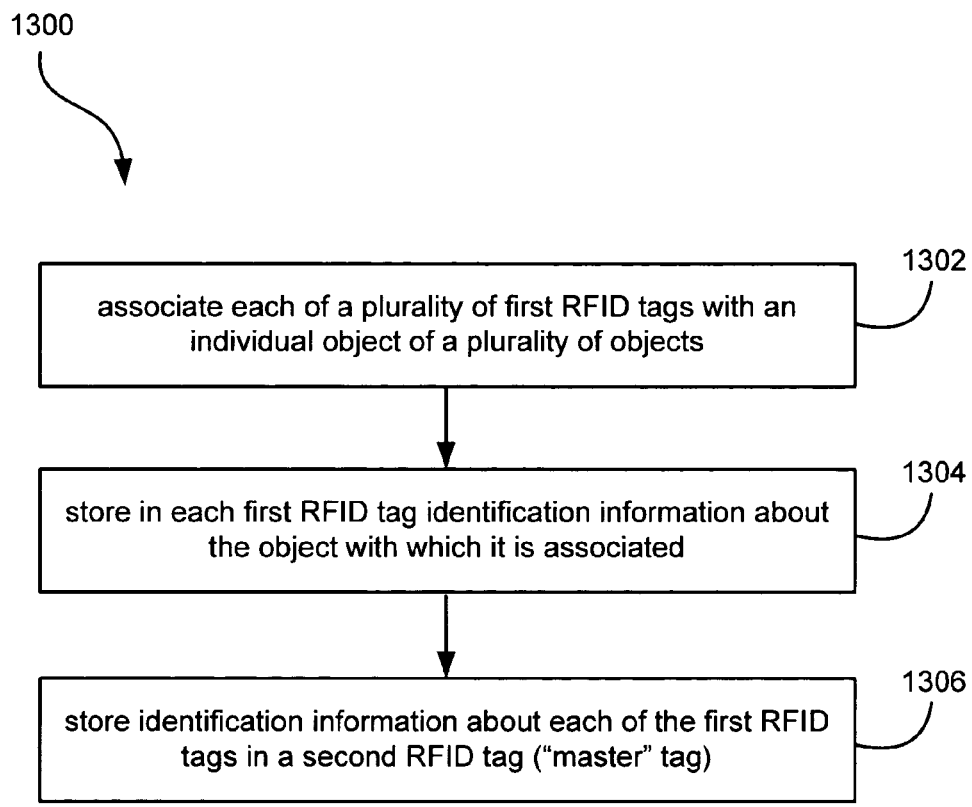
FIG. 13 is a flow diagram of a method for creating a hierarchy of RFID tags according to one embodiment.

FIG. 13 illustrates a method 1300 for creating a hierarchy of RFID tags. In operation 1302, each of a plurality of first RFID tags is associated with an individual object of a plurality of objects. In operation 1304, each first RFID tag stores identification and potentially other information about the object with which it is associated. In operation 1306, identification information about each of the first RFID tags is stored a second RFID tag, the "master" tag. This creates a basic hierarchical structure.

Figure 14:
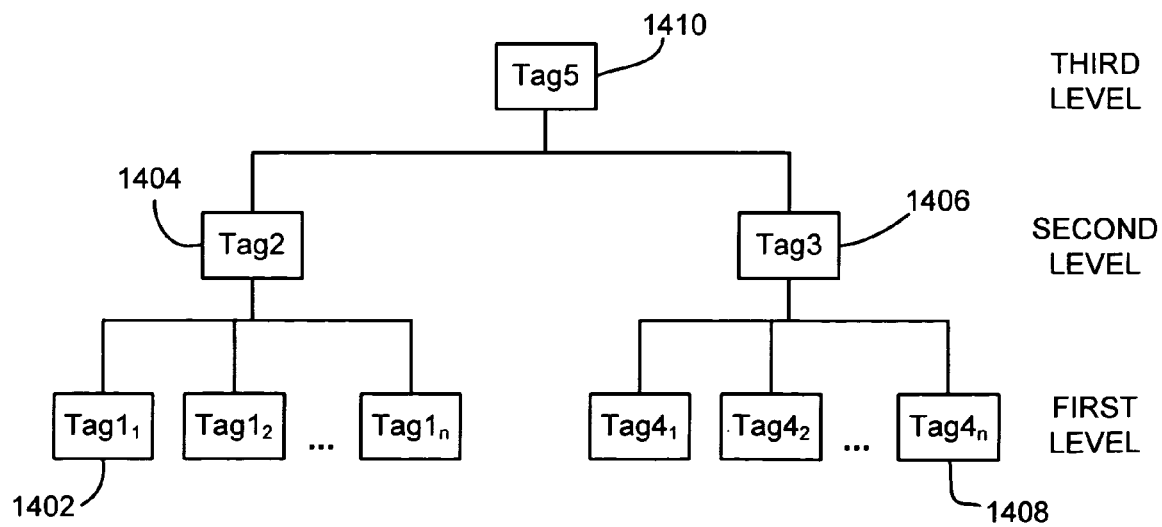
FIG. 14 is a representative diagram of a hierarchy of tags.

The hierarchy can extend to additional levels, as shown in FIG. 14. As shown, the first tags 1402 are below the second tag 1404. A third RFID tag 1406 stores identification information about several fourth RFID tags 1408, each of the fourth RFID tags 1408 being associated with additional objects and identifying the objects with which associated. Thus, the second and third tags 1404, 1406 are "master" tags to the first and fourth tags, 1402, 1408, respectively. A fifth RFID tag 1410 can store information about the second and third RFID tags 1404, 1406 such as access and kill passwords, making the fifth RFID tag 1410 a "master" tag for the second and third tags 1404, 1406. The tags are self-organizing in the hierarchy. In other words, the hierarchy is independent of any external system. Tags at a higher level know the structure of the tags in the lower levels, independent of a reader.

The higher level tags can include any desirable identification information about tags in the level(s) below. Such identification information can include an identification code of each tag, the number of tags in the collection, tag abilities (e.g., five C262 tags, one C362 tags), manufacturing codes, exchanged data from the manufacturer, etc. The identification information can also include any hierarchical data which might require access to a database which may or may not be present.

In general, once the tag is unlocked, the reader can access all data stored on the tag. Thus, the information can be stored in the general memory of the maser tag. However, it may be preferable to allow access to only portions of the memory on an access-by-access basis, so as not to disclose all of the data stored on the tag. In this situation, the information can be stored in blocks of memory of the tag, the blocks in turn being protected by a block password. For instance, the block can hold passwords for other master tags, and they remain hidden or locked until the block access password is presented. The tag can have many such blocks. This allows the tag to provide access to only that information which is needed or authorized for disclosure.

As mentioned above, the tags can employ long-term data storage, designated as tag memory. The memory according to a preferred embodiment is logically separated into four distinct banks, each of which may comprise one or more memory blocks. A memory block can be specified as 16 words of 16-bits per word, for example. Once a tag is in the encrypted state, all memory is accessible with the following exception: memory blocks protected by a non-zero block password shall not be accessed without sending the valid block password via the block password (BPW) commands.

Figure 15:
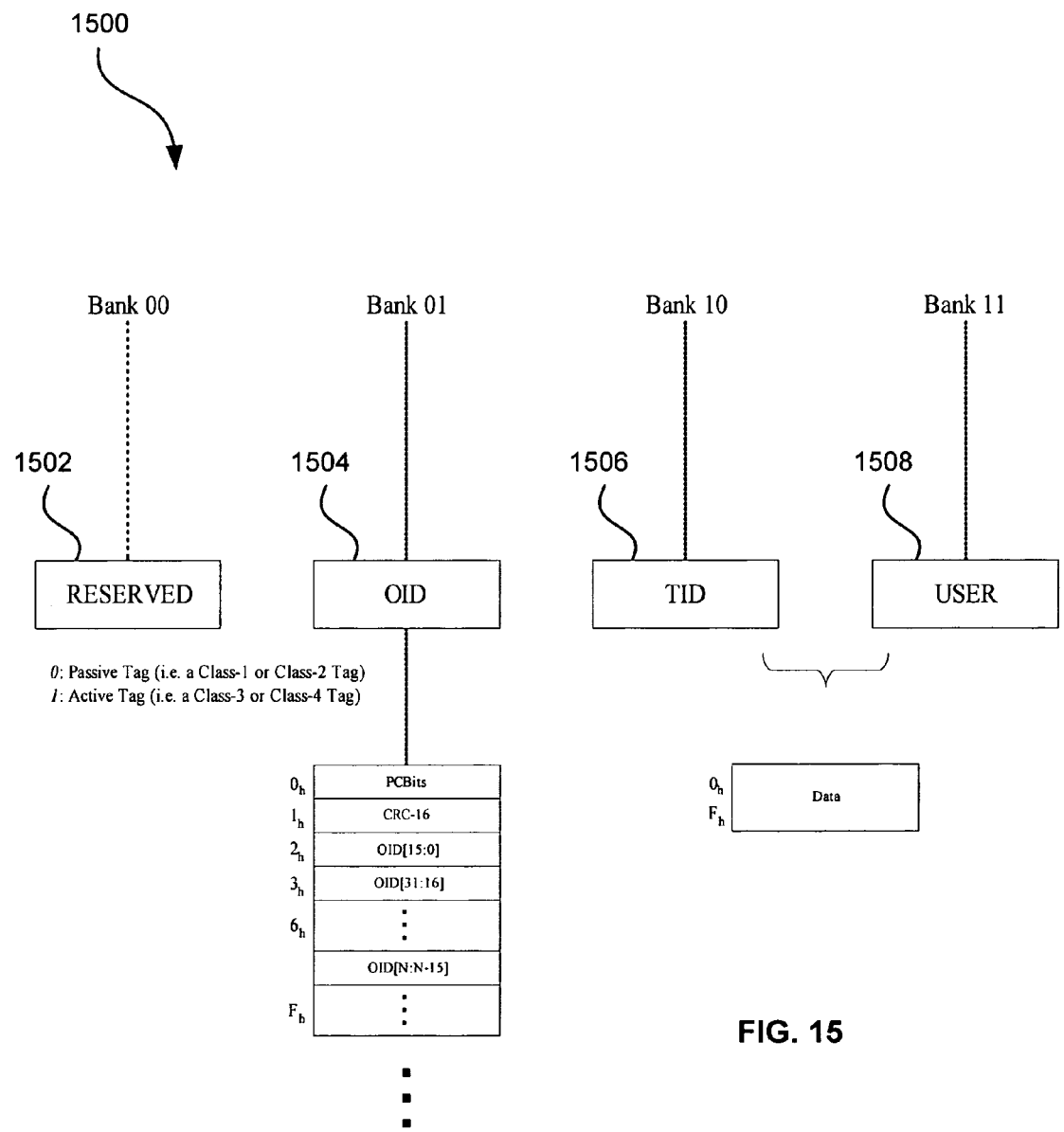
FIG. 15 illustrates a logical memory map of a tag.

A logical memory map 1500 according to a preferred embodiment is shown in FIG. 15. A first memory bank is designated as reserved memory 1502. Reserved memory may only be accessible for both reads and writes from the Encrypted state except for the BPW passwords which can be accessible only via the Encrypted state and appropriate BPW passwords commands. Reserved memory can contain the Kill and Encryption passwords. The reserved block may also contain the read lock and write lock access control and block password for each memory block of each memory bank. An Interrogator issues a BPW write command only from the Encrypted state to write all locations of the reserved memory. The Kill Password shall be stored at memory address 00(h) to 01(h), the first 32 bits of the reserved memory. The Encryption password shall be stored at memory address 02(h) to 03(h). The Activate code shall be located at memory address 04(h). Following these locations memory will be used for control blocks. A control bock contains a write lock, a read lock, and a block password. Each password shall be 32 bits in length. An Interrogator writes the reserved memory by setting MemBank=00(b) in the Write command and providing a memory address. Access for read or write to any of the access control block passwords is only allowed via the BPWwrite and BPWread commands. A Tag shall not, under any conditions, backscatter any of its passwords (kill or encrypt) over an air interface in a plain text manner.

All tags should employ a memory locking and access scheme as described below. For each bank of memory, there shall be a block control allocation of memory. This memory shall control access to and from each block of each bank of memory in the EPC, TID, and user memory spaces. Each block of memory which has been allocated for use in one of the memory banks, shall have a control block associated with it. A control block is made up of four rows of memory. The four words are defined as follows:

a) Write Access shall control write access on a bit per row basis. Bit 0 of the row shall control the writing access to the first row of the block associated with this control block. Bit 1 shall control writing access to row 1, etc. In order to write into a write access row, the encrypted state must be entered. A write access row may be read using a standard read command.
  b) Read Access shall control read access on a bit per row basis. Bit 0 of the row shall control the reading access to the first row of the block associated with this control block. Bit 1 shall control reading access to row 1, etc. In order to write a read access row, the encrypted state must be entered. A read access row may be read using a standard read command.
  c) Block Password shall be accessed only from the encrypted state. It can not be read or written while in any other state. The block password shall be read or written only by an appropriate BPW command issued from the encrypted state.

A second memory bank is designated as Object Identification (EPC) memory 1504. The OID memory contains 16 protocol-control (PC) bits at memory addresses 00(h) to 01(h), a calculated CRC-16 at memory addresses 02(h) to 03(h), and an Object Identifier beginning at address 040(h). An Interrogator accesses OID memory by setting Mem-Bank=01(b) in the appropriate command and providing a memory address. The PC, CRC-16, and EPC shall be stored MSB first.

Tag-Identification (TID) memory 1506 allows tag- and vendor-specific data storage.

User memory 1508 allows user-specific data storage.

The tag knows the block password. The reader also knows the block password, or the block password can be entered by an authorized user. However, to enhance security, the tag and reader can only exchange some portion of the password, e.g., half of the password, based on either the tag or the reader initiating an odd or even exchange. In the case of partial passwords, the reader specifies whether the tag is to respond with the odd or even bits of the password in order to authenticate the tag or reader and initiate an exchange. Assume the reader requests the even bits from the tag. The tag responds with the even bits (0, 2, 4, 6, 8 . . .), and the reader transmits the odd bits (1, 3, 5, 7, 9 . . .) so that both sides of the exchange have the complete password. Only upon receiving the correct password will the block of data stored in the tag become accessible. Write access can also be made available. By requiring each device to provide a part of the block password, the block password is never compromised by someone who gains access to one of the devices. Conversely, even if someone has access to the block password, that person may not be able to access the tag if that person does not have the shared password for primary security. This is because the reader must be authenticated prior to accessing the tag.

This method can apply to accessing a particular functionality of a tag. Various functionalities available on tags are discussed below. This method can also apply to general access to the tag's memory.

In use, if a request-for-secure-link (RSL) password is generic per load, then only "authorized" devices can access the tag. A load means a associated pallet of goods. This initiates the secure exchange. If access to the block is desired, the reader must also submit the block password, or portion thereof, to read the block. In an illustrative exchange, the tag and the reader share a secret general password, which is used to initiate a secure exchange. For the reader to gain access to the block on the tag, the block password must be submitted. The block password can be vendor specific. The block password can be less secure than the general password, as the tag and reader have been authenticated and the tag-reader exchange is already in a secure state.

The class of tags in each hierarchy can be the same or different. For example, class 1 tags can be coupled to the objects, and the master tag can be a class 1 tag. Preferably, the master tag is a class 2 (or higher) tag to take advantage of the desirable features provided by higher class tags, such as enhanced security, greater range, and greater storage capacity. Additionally, a class 2 tag can be programmed to make it easier to identify, so a reader along a shipping route can quickly identify and query the master tag without having to query all of the tags present. If first level tags are to be password protected, class 2 tags are preferred for use as master tags.

Class 3 tags can provide even more functionality. For instance, class 3 tags can include sensors, allowing them to perform such functions as storing temperatures at each destination along the routing path so the recipient can examine the external forces brought to bear on the objects he or she is receiving. Class 3 tags also have greater range, and have particular usefulness as a master tag in a warehouse where remote identification is useful.

Class-3 and other battery-assisted tags may also store or acquire additional information including temperature, temperature history, pressure, timer, ownership data, authorization data, proximity data, etc. This information may be used in combination with or in lieu of passwords to permit or deny access to certain information on the tag based on reference information or settings stored on the tag. For instance, access can be denied until a temperature sensor on the tag reads an ambient or device temperature that falls within a certain range. In another example, access can be denied until a certain ambient pressure is read. This would allow a tag to be shipped on an aircraft, but would not allow access until the aircraft is near the ground (as the cargo area would be at a different pressure). In a further example, access may be denied if the tag becomes separated from its master by more than a predetermined distance. In yet another example, a timer can be used to disable the tag for a predetermined length of time, or for certain time periods of a day, week, month, or year.

Also note that a lower class tag can be a master tag for higher class tags. In one example, a class 1 tag holds information about a class 3 tag. Assume a class 3 tag is cloaked. The class 1 tag stores an uncloak password for the cloaked class 3 tag, either in some memory, or as part of the kill password, or by being able to identify the class 1 tag, the reader can look up the uncloak password to the class 3 tag. Thus, the class 1 tag can be used to identify a pallet of goods and the class 3 tag. The class 3 tag can be accessed (uncloaked) and the class 1 tag can be killed.

To place the concept of master tags in a context, an example will now be provided. Note that this example is not meant to be limiting, as one skilled in the art will understand that such a hierarchical system of tags can be used in a plethora of applications such as package delivery where the objects having first level tags attached thereto are not transported as a single unit, etc.

Figure 16:
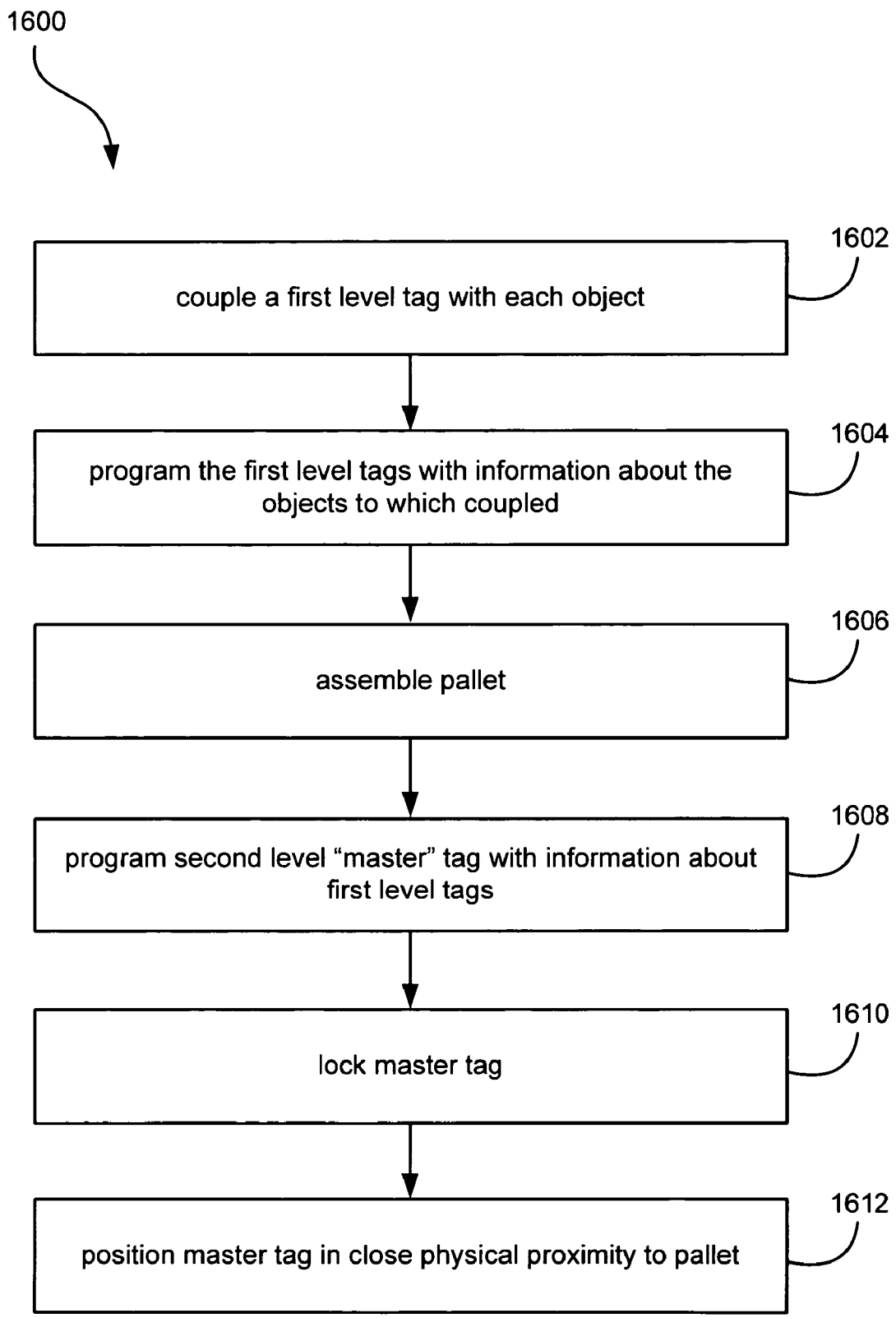
FIG. 16 is a flow diagram of a method for creating a hierarchy of RFID tags for storing information about objects to be placed in a pallet according to an illustrative embodiment.

In this example, assume a pallet of objects is being assembled for shipment to a retail store. FIG. 16 illustrates the method 1600 for creating a hierarchy of RFID tags for storing information about the objects that will be placed on the pallet. A first level tag is coupled to each object in step 1602. In step 1604, each of the tags is programmed with information, such as an identification of the object to which the tag is attached, an access password that must be submitted by the reader in order for it to access the information stored on the tag, a kill password that when its match is received from the reader disables the tag, etc. In step 1606, the pallet is assembled.

In step 1608, a second level "master" tag is programmed to store information about the first level tags in the pallet. A master tag can include many pieces of information about the tags under its hierarchy. For instance, the master tag can store information such as identification information about each of the first level tags, as well as the access and kill passwords for those tags, the type and number of goods in the pallet, passwords, routing information, etc. The master tag can also store counts and locations of the objects so that, for instance, if two cases are missing upon reaching the destination, the user can track down where the loss occurred.

In step 1610, the master tag can be locked. Particularly, the master tag can also be programmed to require a password prior to divulging any of the stored information. Thus, the tags in a lower level cannot be accessed unless the password to the master tag is known. The master tag preferably has a greater level of security than tags at a lower level.

In step 1612, the master tag is placed in the pallet or otherwise kept in close proximity to the pallet. Note that the ordering of the steps is not critical, and can be performed in virtually any order. For instance, the pallet can be assembled virtually, with the tags programmed long before physical assembly of the pallet.

Also note that the hierarchy formed as the pallet is created can include levels other than presented in this example. For example, the first level can include tags on each object. The second level can include master tags for each case of objects. The third level can include master tags for each pallet of cases. The fourth level can include a master tag for all pallets in a truck. A higher level master tag can contain only information about the tags in the level immediately below it, or can include information about tags in several or all layers below it. While Mater Tags preferably will travel physically with the tags or tagged objects it controls, this is not a requirement.

During shipping, the master tag is preferably shipped in close proximity to the lower level tags in the pallet, e.g., also in the pallet, coupled to the pallet, in the same truck or rail car, etc. The passwords are physically moving with the goods they describe. They are associated (in a physical proximity sense) with the goods they describe. In this way, passwords are protected in that they are not sent out over the Internet where a hacker can read the transmission and try to retrieve the passwords. However, the present invention also contemplates shipping the master tag separately, though the coordination of receipt of the master and lower level tags becomes more difficult.

Another manner to enhance security is to provide some aspect of physical security. For instance, the master tag can be stored in a physically secure environment during the transporting, such as in a container or vehicle capable of shielding radio frequency transmissions and/or having a physical locking mechanism that restricts access to the contents of the container. Examples of physical locking mechanisms include lock boxes, safes, etc. Examples of RF shielding mechanisms include metal enclosures, RF shielding fabrics, etc. One skilled in the art will appreciate the various mechanisms required to provide the physical locking and RF shielding.

Also contemplated is a link whereby the tags under the master tag are aware of the presence of the master tag, or vice versa. If either the lower level tag or master tag is removed from the proximity of the other, the master tag locks itself and/or the lower level tag locks itself. The proximity can be determined by the strength or absence of a signal from the tags. A reader accompanying the pallet can also coordinate this type of functionality, providing instructions to the tags upon detecting lack of proximity. The lower level tags can even damage the goods so they are unusable if removed from the proximity of the master tag. For instance, a box of drugs would corrupt itself if removed from the pallet without authorization. Similarly, a tag could mark stolen currency, rendering it unusable. Further, the security aspect can include a time element which engages security measures upon expiration of a period of time. For example, in a filing cabinet, assume a rule states that objects therein can only be out of the cabinet for 20 minutes. If a paper is out of the cabinet for 21 minutes, a tag attached to the paper marks the paper as invalid until the tag is reset by an authorized system. Thus, any attempt to tamper with the system will be detected and the system can take action to minimize the problem.

As a further security measure, the passwords for the master tag and/or lower level tags can be changed and rewritten at any stage in the supply chain. After the passwords for the lower level tag are changed, they are written to the master tag.

Note that the security level can be adjusted as desired. For example, security can be turned off for low importance objects, and on for sensitive objects.

Upon the pallet reaching its destination, the access password for the master tag is loaded into a reader, such as by manual entry of the password. The reader, once loaded with the password for the master tag, can request the access passwords for the tags in the pallet from the master tag. The passwords are then sent from the master tag to the reader in the encrypted payload. The reader, now having the passwords for the first tags, can access the information stored in the first level tags.

If the reader is located at a loading dock, the master tag can be queried to quickly obtain the definition of the goods along with the access information for their individual tags. In this way, the entire pallet can be quickly scanned and the objects therein counted, added to inventory, routed, associated with pricing information, passwords stored in the retailer's computer system for use during on-shelf count and during checkout, etc.

At checkout, a customer merely pushes a cart of objects he or she wishes to purchase past a checkout reader. Because the password and information for each of the first level tags coupled to the objects was retrieved from the master tag and stored in the system, the checkout reader can quickly identify each object, determine its price, and request payment from the customer. The checkout reader can also use the kill password to disable the tags once the desired information is obtained from the tags. For example, kill passwords can be sent to the tags to disable access to some or all information stored therein so no one can read the prohibited information as the customer exits the store in an attempt to determine what the consumer has purchased.

By providing a master tag, the need to have a remote look up table (LUT) with the passwords for all possible tags is avoided. This in turn reduces the processing and memory requirements of the reader, not to mention logistics problems, e.g., how to have passwords follow the pallet to its final destination. A master tag also avoids problems that could be encountered if each tag had the same password and the password were somehow discovered, such as reading of all tags to determine contents, malicious disablement of all tags, potential for theft after tags disabled, malicious party changes the passwords, thereby rendering tags unusable, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for creating a hierarchy of radio frequency identification (RFID) tags, comprising:
    associating a first RFID tag with an individual object, the first RFID tag storing identification information about the object with which it is associated;
    and storing in a second RFID tag information about the first RFID tag;
    wherein a reader receives and uses the information from the second RFID tag to retrieve data directly from the first RFID tag.

2. A method as recited in claim 1, wherein a password must be provided for accessing the information stored on the second RFID tag.

3. A method as recited in claim 1, wherein the second RFID tag also stores an access password for the first RFID tags, the access password being required for accessing information stored on the first RFID tag.

4. A method as recited in claim 3, further comprising changing the access password of the first RFID tag and storing the changed access passwords in the second RFID tag.

5. A method as recited in claim 1, wherein the second RFID tag stores secret information about the first RFID tag.

6. A method as recited in claim 1, wherein the second RFID tag also stores a kill password for disabling access to information stored on the first RFID tag.

7. A method as recited in claim 1, further comprising storing in a third RFID tag information about the second RFID tag.

8. A method as recited in claim 7, further comprising storing in a fourth RFID tag information about the second and third RFID tags.

9. A method as recited in claim 8, wherein the information stored in the fourth RFID tag includes passwords for accessing the second and third RFID tags.

10. A method for creating a hierarchy of radio frequency identification (RFID) tags, comprising:
    associating a first RFID tag with an individual object, the first RFID tag storing identification information about the object with which it is associated;
    storing in a second RFID tag information about the first RFID tag; and
    physically transporting the second RFID tag with the first RFID tag from one geographic location to another location,
    wherein a reader receives and uses the information from the second RFID tag to retrieve data directly from the first RFID tag.

11. A method as recited in claim 10, further comprising changing an access password of the first RFID tag after the transporting and storing the changed access password in the second RFID tag.

12. A method for creating a hierarchy of radio frequency identification (RFID) tags, comprising:
    associating a first RFID tag with an individual object, the first RFID tag storing identification information about the object with which it is associated; and
    storing in a second RFID tag information about the first RFID tag including an access password for enabling communication with the first RFID tag;
    wherein the first tag is a different type of tag than the second tag,
    wherein a reader receives the access password from the second RFID tag and uses the password to retrieve data directly from the first RFID tag.

13. A method as recited in claim 12, wherein the second tag contains more memory than the first tag.

14. A method as recited in claim 12, wherein the first tag is in a different class than the second tag.

15. A hierarchical system of radio frequency identification (RFID) tags, comprising:
    a first RFID tag being associated with an object, the first RFID tag storing information about the object with which it is associated; and
    a second RFID tag storing information about the first RFID tag;
    a reader for receiving and using the information stored in the second RFID tag to retrieve data directly from the first RFID tag.

16. A system as recited in claim 15, wherein the second RFID tag is physically transported with the first RFID tag from one geographic location to another location.

17. A system as recited in claim 15, wherein a password must be provided for accessing the information stored on the second RFID tag.

18. A system as recited in claim 15, wherein the second RFID tag also stores an access password for the first RFID tag, the access passwords being required for accessing information stored on the first RFID tag.

19. A system as recited in claim 18, further comprising changing the access password of the first RFID tag and storing the changed access passwords in the second RFID tag.

20. A system as recited in claim 15, wherein the second RFID tag stores secret information about the first RFID tag.

21. A system as recited in claim 15, wherein the second RFID tag also stores a kill password for disabling access to information stored on the first RFID tag.

22. A system as recited in claim 15, further comprising a third RFID storing information about the second RFID tag.

23. A system as recited in claim 22, further comprising a fourth RFID tag storing information about the second and third RFID tags.

24. A system as recited in claim 23, wherein the information stored in the fourth RFID tag includes passwords for accessing the second and third RFID tags.

25. A hierarchical system of radio frequency identification (RFID) tags, comprising:

a first RFID tag being associated with an object, the first RFID tag storing information about the object with which it is associated; and a second RFID tag storing information about the first RFID tag including an access password for enabling communication directly with the first RFID tag; wherein a reader receives the access password from the second RFID tag and uses the access password to retrieve data directly from the first tag;

wherein the first tag is a different type than the second tag.

26. A system as recited in claim 25, wherein the second tag has more memory than the first tag.

27. A system as recited in claim 25, wherein the first tag is in a different class than the second tag.

28. A method for physical transportation of identification information, comprising:

associating at least one first radio frequency identification (RFID) tag with an individual object, each first RFID tag storing identification information about the object with which it is associated;

storing in a second RFID tag identification information about each of the first RFID tags; and physically transporting the second RFID tag with the first RFID tags from one geographic location to another location;

wherein a reader receives and uses the information about the first RFID tags from the second RFID tag to retrieve data directly from the first RFID tags.

29. A method as recited in claim 28, wherein a password must be provided for accessing the identification information stored on the second RFID tag.

30. A method as recited in claim 28, wherein the second RFID tag also stores access passwords for each of the first RFID tags, the access passwords being required for accessing information stored on the first RFID tags.

31. A method as recited in claim 30, further comprising changing the access passwords of the first RFID tags after the transporting and storing the changed access passwords in the second RFID tag.

32. A method as recited in claim 28, wherein the second RFID tag also stores kill passwords for disabling access to information stored on the first RFID tags.

33. A method as recited in claim 28, further comprising storing in a third RFID tag identification information about several fourth RFID tags, each of the fourth RFID tags being associated with additional objects, the fourth RFID tags identifying the objects with which associated.

34. A method as recited in claim 33, further comprising storing in a fifth RFID tag information about the second and third RFID tags.

35. A method as recited in claim 34, wherein the information stored in the fifth RFID tag includes passwords for accessing the second and third RFID tags.

36. A method as recited in claim 28, wherein each of the first tags is physically coupled to the object with which it is associated, wherein the second tag is operatively physically coupled to a container holding the first tags during the transporting.

37. A method as recited in claim 28, further comprising storing the second RFID tag in a physically secure environment during the transporting.

38. A method as recited in claim 37, wherein the secure environment includes a container capable of shielding radio frequency transmissions.

39. A method as recited in claim 37, wherein the secure environment includes a container having a physical locking mechanism.

40. A method as recited in claim 28, wherein one of the first RFID tags becomes locked if it removed from physical proximity of the second RFID tag beyond a predetermined distance.

41. A method as recited in claim 28, wherein one of the first RFID tags causes the object with which associated to become physically damaged if the first RFID tag is removed from physical proximity of the second RFID tag beyond a predetermined distance.

42. A method as recited in claim 28, wherein the first tags are in a lower class than the second tag.

43. A method as recited in claim 28, wherein the first tags are in the same class as the second tag.

44. A method as recited in claim 28, wherein the first tags are in a higher class than the second tag.

45. A method for physical transportation of identification information, comprising:

associating each of a plurality of first radio frequency identification (RFID) tags with an individual object of a plurality of objects, each first RFID tag storing identification information about the object with which it is associated;

storing in a second RFID tag identification information about each of the first RFID tags;

physically transporting the second RFID tag with the first RFID tags from one geographic location to another location; wherein the second RFID tag wherein a reader receives one of the access passwords from the second RFID tag and uses the password to retrieve data directly from one of the first RFID tags also stores access passwords for each of the first RFID tags, the access passwords being required for directly accessing information stored on the first RFID tags;

changing the access passwords of the first RFID tags and storing the changed access passwords in the second RFID tag.

46. A method as recited in claim 45, wherein the second RFID tag also stores kill passwords for each of the first RFID tags, the kill passwords being required for disabling the first RFID tags, wherein one of the first RFID tags causes the object with which associated to become physically damaged if the first RFID tag is removed from physical proximity of the second RFID tag beyond a predetermined distance or upon expiration of a predetermined time period.

47. A radio frequency identification (RFID) system, comprising:

a first RFID tag protected by a physical locking mechanism, a RF shielding mechanism, and an access password a second RFID tag storing the access password for the first RFID tag, wherein a reader receives the access password from the second RFID tag and uses the access password to retrieve data directly from the first RFID tag.

48. A method as recited in claim 47, wherein the RFID tag stores information about a plurality of other RFID tags.

49. A method for creating a hierarchy of interrelated radio frequency identification (RFID) tags, comprising:

associating each of a plurality of first RFID tags with an individual object of a plurality of objects, each first RFID tag storing identification information about the object with which it is associated, each of the first RFID tags having an access password associated therewith, the access passwords being required for accessing the identification information in the first RFID tags; and storing in a second RFID tag the passwords for each of the first RFID tags, wherein a second RFID tag access password must be provided for wherein a reader receives one of the passwords associated with one of the first RFID tags from the second RFID tag and uses the password to retrieve data directly from the associated first RFID tag accessing the access passwords of the first RFID tags stored on the second RFID tag; and changing the access passwords of the first RFID tags and storing the changed access passwords in the first RFID tans and the second RFID tag.

50. A method as recited in claim 49, further comprising wherein one of the first RFID tags causes the object with which associated to become physically damaged if the first RFID tag is removed from physical proximity of the second RFID tag beyond a predetermined distance or upon expiration of a predetermined time period.

51. A method as recited in claim 49, wherein the second RFID tag also stores kill passwords for disabling access to information stored on the first RFID tags.

52. A method as recited in claim 49, further comprising storing in a third RFID tag access passwords of several fourth RFID tags, each of the fourth RFID tags being associated with additional objects, the fourth RFID tags identifying the objects with which associated, wherein a third RFID tag access password must be provided for accessing the access passwords of the fourth RFID tags stored on the third RFID tag.

53. A method as recited in claim 52, further comprising storing in a fifth RFID tag the access passwords for the second and third RFID tags.

54. A radio frequency identification (RFID) tag system, comprising:
   a plurality of first RFID tags each associated with an individual object of a plurality of objects, each first RFID tag storing identification information about the object with which it is associated, each of the first RFID tags having an access password associated therewith, the access passwords being required for accessing the identification information in the first RFID tags, wherein the access passwords of the first RFID tags are changeable; and
   a second RFID tag storing the passwords for each of the first RFID tags, wherein a second RFID tag access password must be provided for wherein a reader receives one of the access passwords from the second RFID tag and uses the password to retrieve data directly from the first RFID tag associated with the one of the access passwords accessing the access passwords of the first RFID tags stored on the second RFID tag.

55. A radio frequency identification (RFID) tag system, comprising:
   a plurality of first RFID tags each having an access password associated therewith and stored thereon, the access passwords being required for accessing identification information stored in the first RFID tags, wherein the access passwords of the first RFID tags are changeable; and
   a second RFID tag storing the passwords for each of the first RFID tags wherein a reader receives one of the access passwords form the second RFID tag and uses the password to retrieve data directly from the first RFID tag associated with the one of the access passwords.

56. A system as recited in claim 55, wherein a second RFID tag access password must be provided for accessing the access passwords of the first RFID tags stored on the second RFID tag.

57. A radio frequency identification (RFID) tag system, comprising:
   a first RFID tag having an access password associated therewith and stored thereon, the access password being required for accessing identification information stored in the first RFID tag, wherein the access password of the first RFID tag is changeable; and
   a second RFID tag storing the password for the first RFID tag wherein a reader receives the access password from the second RFID tag and uses the password to retrieve data directly from the first tag.

58. A system as recited in claim 57, wherein the first tag is in a lower class than the second tag.

59. A system as recited in claim 57, wherein the first tag is in the same class as the second tag.

60. A system as recited in claim 57, wherein the first tag is in a higher class than the second tag.

61. A method for creating a hierarchy of radio frequency identification (RFID) tags, comprising:
   associating each of a plurality of first RFID tags with an individual object of a plurality of objects, each first RFID tag storing identification information about the object with which it is associated; and
   storing in a second RFID tag information about each of the first RFID tags; wherein the second RFID tag also stores access passwords for each of the first RFID tags, the access passwords being required for accessing information stored on the first RFID tags; and wherein a reader receives one of the access passwords from the second RFID tag and uses the password to retrieve data directly from the first RFID tag associated with the one of the access passwords;
   changing the access passwords of the first RFID tags and storing the changed access passwords in the first RFID tags and the second RFID tag.

62. A hierarchical system of radio frequency identification (RFID) tags, comprising:
   a plurality of first RFID tags, each of the first RFID tags being associated with an individual object of a plurality of objects, each first RFID tag storing information about the object with which it is associated; and
   a second RFID tag storing information about each of the first RFID tags;
   wherein the second RFID tag also stores access passwords for each of the first RFID tags, the access passwords being required for accessing information stored on the first RFID tags, wherein a reader receives one of the access passwords from the second RFID tag and uses the password to retrieve data directly from the first RFID tag associated with the one of the access passwords;
   wherein the access passwords of the first RFID tags are stored on the first RFID tags,
   wherein the access passwords stored on the first RFID tags are changeable on the first RFID tags.

63. A method for creating a hierarchy of radio frequency identification (RFID) tags, comprising:
   associating each of a plurality of first RFID tags with an individual object of a plurality of objects, each first RFID tag storing identification information about the object with which it is associated; and
   storing in a second RFID tag information about each of the first RFID tags;
   wherein the second RFID tag also stores kill passwords for each of the first RFID tags, the kill passwords being required for disabling access to only some information stored on the first RFID tags wherein a reader receives one of the kill passwords from the second RFID tag and uses the password to communicate directly with the first RFID tag associated with the one of the kill passwords.

64. A hierarchical system of radio frequency identification (RFID) tags, comprising:
- a plurality of first RFID tags, each of the first RFID tags being associated with an individual object of a plurality of objects, each first RFID tag storing information about the object with which it is associated; and
- a second RFID tag storing information about each of the first RFID tags;
- wherein the second RFID tag also stores kill passwords for each of the first RFID tags, the kill passwords being required for disabling access to only some information stored on the first RFID tags wherein a reader receives one of the kill passwords from the second RFID tag and uses the password to communicate directly with the first RFID tag associated with the one of the kill passwords.

65. A radio frequency identification (RFID) system, comprising:
- a RFID tag; and
- a reader;
- wherein one password is used to encrypt a transmission of a second password there between wherein the reader receives the second password from the RFID tag and uses the second password to communicate directly with a second RFID tag associated with the second password.

66. A method as recited in claim 65, wherein the second password is a block password.

67. A method as recited in claim 65, wherein the second password is an access password for the second tag.

68. A method as recited in claim 65, wherein the second password is a kill password for the second tag.

69. A method for forming a group of tagged objects, comprising:
- coupling first radio frequency identification (RFID) tags to a plurality of objects;
- programming each of the first RFID tags with a password and identification information;
- creating a physical assembly of the objects with the first tags coupled thereto;
- transferring information about the first tags to a second tag, wherein the information about the first tags includes access passwords and block passwords stored on the first tags,
- wherein the access passwords stored on the first tags are changeable,
- wherein the block passwords stored on the first tags are changeable,
- wherein each block password is for permitting access to data stored in a block of wherein a reader receives one of the passwords from the second RFID tag and uses the password to communicate with one of the first RFID tags memory on the tag storing the block password.

70. A method as recited in claim 69, further comprising locking the second tag.

71. A method as recited in claim 69, further comprising coupling the second tag to the physical assembly of objects.

72. An RFID device with memory, a password stored in said memory, other non-password information stored in said memory, wherein access to one part or all of said memory is conditioned on both the password and non-password information stored in another part of said memory.

73. A device as recited in claim 72, wherein the additional information is selected from a group consisting of temperature, temperature history, pressure, timer, ownership data, authorization data, proximity data.

* * * * *